US011030867B1

(12) United States Patent
Zagami et al.

(10) Patent No.: US 11,030,867 B1
(45) Date of Patent: Jun. 8, 2021

(54) SYSTEM AND METHOD FOR THE ASSIGNMENT OF PASSENGERS TO AVAILABLE LIFEBOAT

(71) Applicants: Anthony Zagami, Jupiter, FL (US); Gregory Ruhl, Lake Worth, FL (US); Wayne Bartnick, North Palm Beach, FL (US); Roman Yellin, Lake Clark Shores, FL (US); Adam Montali, Boynton Beach, FL (US)

(72) Inventors: Anthony Zagami, Jupiter, FL (US); Gregory Ruhl, Lake Worth, FL (US); Wayne Bartnick, North Palm Beach, FL (US); Roman Yellin, Lake Clark Shores, FL (US); Adam Montali, Boynton Beach, FL (US)

(73) Assignee: SECURITY IDENTIFICATION SYSTEMS, INC., West Palm Beach, FL (US)

( * ) Notice: Subject to any disclaimer, the term of this patent is extended or adjusted under 35 U.S.C. 154(b) by 0 days.

(21) Appl. No.: 16/510,887

(22) Filed: Jul. 13, 2019

Related U.S. Application Data

(60) Provisional application No. 62/699,054, filed on Jul. 17, 2018.

(51) Int. Cl.
| G08B 7/06 | (2006.01) |
| B63B 23/70 | (2006.01) |
| G08B 26/00 | (2006.01) |
| H04W 4/90 | (2018.01) |
| G08B 5/22 | (2006.01) |

(52) U.S. Cl.
CPC ............... *G08B 7/06* (2013.01); *B63B 23/70* (2013.01); *G08B 5/229* (2013.01); *G08B 26/008* (2013.01); *H04W 4/90* (2018.02)

(58) Field of Classification Search
None
See application file for complete search history.

(56) References Cited

U.S. PATENT DOCUMENTS

| 3,896,515 | A * | 7/1975 | Otterman | B63C 9/06 |
| | | | | 114/349 |
| 7,242,303 | B2 * | 7/2007 | Patel | G07C 9/28 |
| | | | | 340/572.4 |
| 7,768,394 | B2 * | 8/2010 | Amidi | H04L 67/18 |
| | | | | 340/539.16 |

(Continued)

*Primary Examiner* — Fekadeselassie Girma
(74) *Attorney, Agent, or Firm* — Joseph R. Carvalko, Jr.

(57) ABSTRACT

A system and method for accessing a lifeboat including identifying and accounting for individuals needing access to a lifeboat having one or more CPUs, one or more databases, a plurality mobile PDA, dependent on receiving an initiating signal, and thereafter receiving from receiver a lockout condition, that utilizes a register for decrementing the available space in a lifeboat dependent on a received lockout condition, at least on of the CPUs having a program for accounting for passengers, who require access to a available space on a lifeboat, mustering and re-routing the passengers to muster stations based an algorithm that calculates available space, and assigning passengers to a lifeboat, dependent on an algorithm that assigns passengers to available space on a lifeboat, so passengers will be safely and expediently assigned to fillable space on a serviceable lifeboat.

10 Claims, 30 Drawing Sheets

(56) References Cited

U.S. PATENT DOCUMENTS

| | | | | |
|---|---|---|---|---|
| 8,970,367 B2* | 3/2015 | Meraz | ............... | G08B 26/008 |
| | | | | 340/539.13 |
| 10,356,138 B2* | 7/2019 | Novo Diaz | ............ | H04L 41/12 |
| 10,489,737 B2* | 11/2019 | Racz | .................. | H04W 4/90 |
| 10,582,335 B1* | 3/2020 | Weir | ................ | G06Q 30/0218 |
| 2005/0075116 A1* | 4/2005 | Laird | .................. | A61B 5/411 |
| | | | | 455/456.3 |
| 2006/0250271 A1* | 11/2006 | Zimmerman | ............ | G08B 5/22 |
| | | | | 340/8.1 |
| 2007/0044539 A1* | 3/2007 | Sabol | ................... | G06Q 10/06 |
| | | | | 73/19.01 |
| 2008/0129467 A1* | 6/2008 | Gennard | ................ | G07C 1/10 |
| | | | | 340/286.11 |
| 2008/0314681 A1* | 12/2008 | Patel | .................... | A62B 3/00 |
| | | | | 182/18 |
| 2010/0282839 A1* | 11/2010 | Zura | .................... | G06Q 10/00 |
| | | | | 235/382 |
| 2011/0109434 A1* | 5/2011 | Hadsall, Sr. | ......... | G08B 21/0275 |
| | | | | 340/8.1 |
| 2011/0215910 A1* | 9/2011 | Bouressa | ............... | G07C 9/27 |
| | | | | 340/10.1 |
| 2012/0280812 A1* | 11/2012 | Sheikman | ............. | G01S 13/825 |
| | | | | 340/539.13 |
| 2014/0076969 A1* | 3/2014 | Marshall Chesney | ...................... | |
| | | | | G07C 9/00904 |
| | | | | 235/382 |
| 2014/0340220 A1* | 11/2014 | Meraz | ................ | G08B 26/008 |
| | | | | 340/539.13 |
| 2018/0139569 A1* | 5/2018 | Padgett | ................... | H04W 4/80 |
| 2019/0340560 A1* | 11/2019 | Sundia | ............... | G06K 7/10396 |

\* cited by examiner

FIG. 9

| | | |
|---|---|---|
| A1 | 1/2 LB01 | 225 |
| A2 | 1/2 LB02 | 224 |
| TOTAL | | 449 |
| B1 | 1/2 LB03 | 159 |
| | 1/2 LB05 | 56 |
| B2 | 1/2 LB04 | 130 |
| | 1/2 LB06 | 85 |
| B3 | 1/2 LB01 | 129 |
| | 1/2 LB03 | 225 |
| B4 | 1/2 LB02 | 130 |
| | 1/2 LB04 | 224 |
| TOTAL | | 1138 |
| C1 | 1/2 LB05 | |
| | 1/2 LB07 | |
| C2 | 1/2 LB06 | |
| | 1/2 LB08 | |
| C3 | 1/2 LB07 | |
| C4 | 1/2 LB08 | |
| TOTAL | | |
| D1 | 1/2 LB07 | 164 |
| D2 | 1/2 LB08 | 165 |
| D3 | 1/2 LB09 | 331 |
| D4 | LB10 | |
| TOTAL | | |
| F1 | LB13 | 354 |
| F2 | LB14 | 354 |
| F3 | 1/2LB15 | 205 |
| F4 | 1/2LB16 | 206 |
| TOTAL | | 1119 |
| G1 | 1/2 LB15 | 149 |
| G2 | 1/2 LB16 | 148 |
| G3 | LB17 | 354 |
| G4 | LB18 | 354 |
| TOTAL | | 1005 |
| | | 6780 |

| | | |
|---|---|---|
| 19 | | 560 |
| 19 O/Cap 1 | | 153 |
| 19 O/Cap 2 | | 153 |
| 19 O/Cap 3 | | 153 |
| 19 O/Cap 4 | | 153 |
| 19 O/Cap 5 | | 51 |
| 19.1 | | 204 |

A

B

| | 19 | | 560 |
| | 19 O/Cap 1 | | 153 |
| | 19 O/Cap 2 | | 153 |
| | 19 O/Cap 3 | | 153 |
| | 19 O/Cap 4 | | 153 |
| | 19 O/Cap 5 | | 51 |
| | 19.1 | | 260 |

A

B

US 11,030,867 B1

SYSTEM AND METHOD FOR THE ASSIGNMENT OF PASSENGERS TO AVAILABLE LIFEBOAT

CROSS-REFERENCE TO RELATED APPLICATIONS

This non provisional patent application claims the priority benefit under 35 U.S.C. 120 of U.S. provisional patent application Ser. No. 62/699,054, filed on Jul. 17, 2018, the entire disclosure of which are hereby incorporated by reference.

FIELD OF THE INVENTION

The invention relates generally to a method and system, as implemented by electronic and mechanical devices that determine the operational status of a lifeboat, transmission devices that communicate the operational status to a computer system which contains a software program for real-time tracking, accounting, and dependent on an algorithm, provides for the assignment of passengers to space available on lifeboat during an emergency.

BACKGROUND OF THE INVENTION

Ships have a particular requirement for a muster station to insure the rapid assembly of passengers and crew in cases of emergency. The muster protocols include lifeboat drills, general emergency stations support. In the U.S. compulsory coast guard muster drills are mandatory and required under U.S. law. These activities assess the readiness of a crew to execute evacuation of ships under complex of scenarios found in off shore disasters. Therefore, mustering/evacuation systems and analysis must be prepared for a wide range of incidents that might occur on a ship in realistic sea environments. In a conventional muster process undertaken without the aid of a computer, the starting point is to obtain crew and passenger numbers, profiles and location, especially when status may change as for example when passengers go on shore at a tourist port.

Mustering and disembarkation must be efficient and safe. As ships take on greater and greater populations, crew performance and responsibilities during mustering and during a crisis generally need to be well defined and have the latest technology.

A vessel's crew is responsible for defining how muster locations fill lifeboat in case of an emergency. Each muster location has a predefined number of passengers guided to each of the lifeboat. Due to the distribution of Passenger in Staterooms, a muster location can have assigned passengers over the capacity of the linked lifeboat 127. Additionally a lifeboat can become inoperative (Out of Service). This can be determined prior to any emergency or during an emergency.

Lifeboat deployment systems typically include cables extending between a hull engager and a mother ship. The cables may be wound around respective pulleys and connected to the hull engager to its bow. In use, the pulleys act as anchor points for the hull engager, determining the points on the mother ship to which the hull engager is pulled. The cables are connected to respective winches, which control the payout of the cables. As typical, the pulleys are mounted on guide rails that position the pulleys on the mother ship. Other descriptions of lifeboat deployment engagement systems exist, such as described in U.S. Pat. No. 7,832,350, which describes a mechanism for supporting and releasing a lifeboat, where a pair of hooks releasably engaged with a corresponding pair of lifting links. The lifeboat release assembly may include a release handle, a release arm, an emergency release shaft, a weighted rack, and a pair of flexible cables attached at first ends to the rack and attached at second ends to the hooks. The release handle attaches to the release arm at a pivot point and when pulled, releases the lifting links from the hooks. An emergency ratchet lever engages with the emergency release shaft for releasing the fall lifeboat under load. Not included in this particular apparatus or other types of releasable systems are one or more locks that would prevent or disable the lifeboat from being deployed in the event that the lifeboat were unable to carry out its function due to a malfunction. A lock incorporated into the release system could be equipped with a sensing mechanism, such as a switch, to allow the lock to communicate its status to enable ship systems to reorganize a ship's muster locations.

In a non-emergency, the crew determines, which muster locations passengers should transition to, based on headcounts, availability of lifeboats and proximity to lifeboats. When an emergency is in progress that necessitates abandoning ship, the passengers are notified, and they are ordered to various muster locations. Currently, there exists no automatic means to notify passengers, where to muster in the event a lifeboat becomes inoperative. And furthermore, there is no system that determines a lifeboat serviceability or disability for purposes or redistributing passengers relative to muster locations. What is needed is a system that determines that when a lifeboat is out of service, passengers are re-routed according to the availability of space and location of in-service lifeboats, and takes into consideration other criteria for assignment, such as keeping groups of related individuals together (e.g. families) and weight and balance (FIG. 7, 704).

What is impossible to achieve, during an emergency, is to account for and reassign every passenger in each muster location, with efficiency commensurate with the requirement for immediate evacuation of the ship. Further what is needed is a computational means to accounted for each individual, in each muster location, in respect to the overall survival craft capacity, i.e., a lifeboat, that could serving muster locations. If any given muster location were unable to be fully serviced by the respective survival craft, then passengers must be immediately redistributed to other muster locations where survival craft capacity is adequate.

SUMMARY OF THE INVENTION

The invention herein generally pertains to a utilizing sensors to detect, determine, measure and assess one or more conditions, states of affairs, physical properties and process as each relates to assigning passengers to available lifeboats during an emergency at sea. A lifeboat is determined to be inoperative, either through a lockout of its deployment mechanism, or an automatized sensing mechanism that confirms a lockout, or through any notification received by a crewmember (collectively, a "lockout condition"), thus placing it out of service.

A system depending on a lockout condition determines lifeboat availability, and includes: A. one or more CPUs, one or more databases, a plurality of mobile PDA, for communicating with the system, which includes an initiating system for signaling an emergency, a controller for receiving notification of an emergency and sending a lifeboat lockout condition to a receiver, to decrement a count in a register accounting for available space in a lifeboat dependent on the lifeboat lockout condition; B. at least one of the CPUs having a program for (a) accounting for passengers, who require access to the available space on the lifeboat, (b) mustering, and (c) re-routing the passengers to muster stations, based on available space; C. and, assigning passengers to a lifeboat, dependent on an algorithm initiated by receipt of the decrement in a count in the register accounting for available space in the lifeboat dependent on the lifeboat lockout condition, in order to assign passengers to available space on a lifeboat, so that in the case of an emergency, when one or more lifeboats are in a lockout condition, whereby passengers will be safely and expediently assigned to fillable space on a lifeboat.

In one embodiment, the present invention relates to the presence of an emergency that initiates systems for determining a lifeboat inventory's capacity and operational status by receiving a signal of lifeboat unavailability, derived from one or more of the following: (1) a poll of a lifeboat lockout sensing device related to its electromechanical lifeboat deployment system; (2) a sensed interrupt signal, initiated by the electromechanical deployment system, (3) an data entry in a data base associate with the availability of a lifeboat, utilizing lifeboat maintenance records, any of the foregoing which initiate a process for organizing passengers into an available lifeboat.

An emergency that initiates the systems to determine lifeboat availability, includes a signal generator for sending a signal to a controller that transmits a lifeboat lockout condition, the initiating signal resulting from one or more of: 1. One or more sensors that actuate various alarms signaling the condition of electrical and mechanical systems aboard the ship, 2. fire alarms, 3. recorded emergency messages, 4. personal text messages during an emergency, 5. Emergency broadcasts over a public address system.

By initiating a polling process to determine a lockout condition, including communicating with, and receiving an acknowledgment from, a controller at each of the lifeboats, each of the controllers having a corresponding digital address unique to the corresponding lifeboat; responsive to receipt of the acknowledgment, transmitting a start code, to cause the computation of an algorithm to determine passenger logistics of assembling and being distributed to available lifeboats.

The present invention relates to a method that automatically determines, a lifeboat capacity and operational status signaling their unavailability, by one determining a lockout condition, using one or more of the following methods: (1) polling a lifeboat sensing device related to its electromechanical deployment devices, (2) sensing an interrupt signal, initiated by the electromechanical deployment devices, (3) generating data on the availability of a lifeboat by recourse to maintenance records, any of which initiates a process for organizing passengers into available lifeboat.

In one embodiment of the invention, any muster location can be serviced by multiple lifeboats, and a single lifeboat may service multiple muster locations. In the latter case, the lifeboat capacity is subdivided, and each remaining fraction is paired with a respective muster location.

The present invention relates to a real time method as implemented on the computer system for providing interactive access control, monitoring, identifying and accounting for individuals who need to gain access to a lifeboat including: determining the serviceability of a lifeboat, loading into a mobile device one memory data for registered passengers individuals; loading into a mobile device memory location data and passenger information, for one of mustering said passengers, tracking, and assigning passengers to respond to the emergency evacuation of a ship.

The present invention also relates to a computerized method for providing passenger access to a lifeboat, including: (A) identifying and accounting for individuals needing access to a lifeboat utilizing one or more CPUs, one or more databases, a plurality mobile PDA; (B) receiving a lifeboat lockout condition; (C) decrementing the available space in a lifeboat dependent on the lifeboat lockout condition, (D) mustering and re-routing one or more passengers to muster stations based on available space, and (E) assigning them to a lifeboat, dependent on: (a) obtaining a count of all passengers based on their current muster location; (b) ordering muster and lifeboat pairing of a pre-determined sequence; (c) merging data from steps a and b, based on muster location, into a single, sequenced list; (c) then for each muster location, in a sequence order, filling each paired lifeboat, until the muster location is one of an empty lifeboat or the lifeboat is full; (d) decrementing the total count of passengers from each muster location, based on the filled capacity of each available lifeboat; (e) testing for any muster locations with passenger overages greater than zero; (f) searching for remaining space in any shared lifeboat; (g) adding information to route such that passengers can remain in their current muster location, while continuing to fill available lifeboats or any muster locations that remain in an overages condition; (h) searching neighboring muster locations for remaining lifeboat capacity: (1) assigning a search radius of one, and searching pairs with a sequence variance on either side of a current pair's sequence; (2) increasing the search radius by one, and, (3) repeating steps (h) (1) and (h) (2), until no pairs exist; (j) when lifeboat capacity is found, (1) adding information to the route, to order passengers to muster locations, serviced by an available lifeboat; (k) repeating step (e) for any survival crafts marked as standby; (m) if any muster locations exist with overages, then (n) notifying of a critical situation.

The present invention also relates to a non-transitory computer readable storage medium storing computer executable instructions, which when executed by a computer at a central location cause the computer to carry out a method for providing passenger access to a lifeboat, including: A computerized method for providing passenger access to a lifeboat, comprising: (A) identifying and accounting for individuals needing access to a lifeboat utilizing one or more CPUs, one or more databases, a plurality mobile PDA; (B) receiving a lifeboat lockout condition; (C) decrementing the available space in a lifeboat dependent on the lifeboat lockout condition, (D) mustering and re-routing one or more passengers to muster stations based on available space, and (E) assigning them to a lifeboat, dependent on: (a) obtaining a count of all passengers based on their current muster location; (b) ordering muster and lifeboat pairing of a pre-determined sequence; (c) merging data from steps a and b, based on muster location, into a single, sequenced list; (c) then for each muster location, in a sequence order, filling each paired lifeboat, until the muster location is one of an empty lifeboat or the lifeboat is full; (d) decrementing the total count of passengers from each muster location, based on the filled capacity of each available lifeboat; (e) testing for any muster locations with passenger overages greater than zero; (f) searching for remaining space in any shared lifeboat; (g) adding information to route such that passengers can remain in their current muster location, while continuing to fill available lifeboats or any muster locations that remain in an overages condition; (h) searching neighboring muster locations for remaining lifeboat capacity: (1)

assigning a search radius of one, and searching pairs with a sequence variance on either side of a current pair's sequence; (2) increasing the search radius by one, and, (3) repeating steps (h) (1) and (h) (2), until no pairs exist; (j) when lifeboat capacity is found, (1) adding information to the route, to order passengers to muster locations, serviced by an available lifeboat; (k) repeating step (e) for any survival crafts marked as standby; (m) if any muster locations exist with overages, then (n) notifying of a critical situation.

BRIEF DESCRIPTION OF THE DRAWINGS

FIG. 9 is a graphical user interface for tracking and accounting of individuals to determine their absence or presence on board vessels to assign them to life boats according to an embodiment of the present invention.

FIG. 12 is a graphical user interface for tracking and accounting of individuals to determine their absence or presence on board vessels to assign them to life boats according to an embodiment of the present invention.

DESCRIPTION OF PREFERRED EMBODIMENT

Figure 1A:
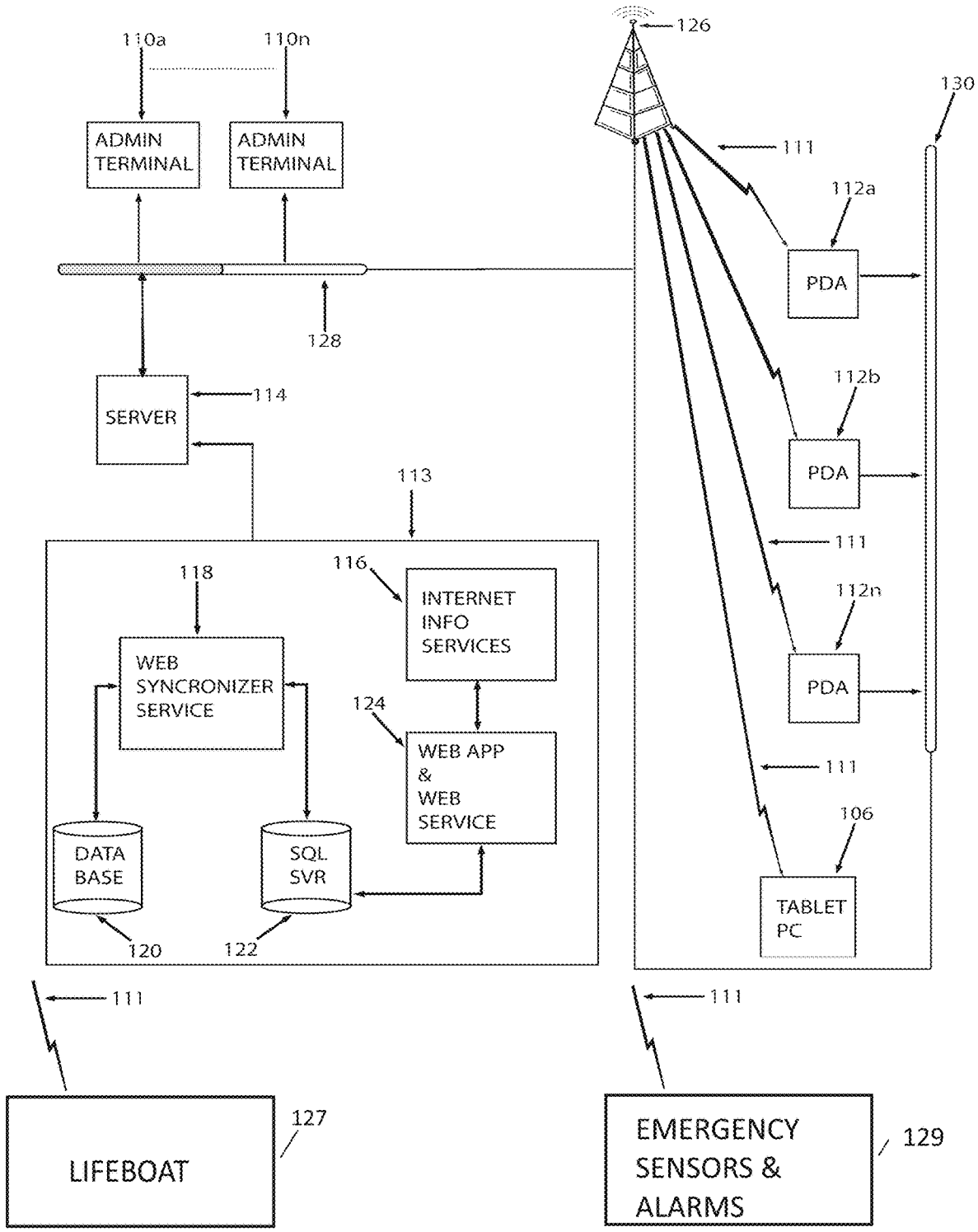
FIG. 1A is a block diagram of a system for tracking and accounting of individuals to determine their absence or presence on board vessels in stationary facilities according to an embodiment of the present invention.

The present invention will now be described more fully hereinafter with reference to the accompanying drawings, in which preferred embodiments of the invention are shown. The following detailed description includes the best mode of carrying out the invention, which may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Each part or function is assigned, even if structurally identical to another part, a unique reference number, wherever that part is shown in the drawing figures.

It is to be understood that the figures and descriptions of the present invention have been simplified to illustrate elements that are relevant for a clear understanding, while eliminating, for the purpose of clarity, many other elements found in computing systems and methods of making computations.

The disclosure herein describes an inventive system and process that automatically determines, one or more lifeboat capacities and their status, by one or more of (1) checking a database of lifeboat service availability; (2) polling lifeboat electromechanical devices, the status of which are set as a function of the lifeboat serviceability; (3) signals received, from lifeboat electromechanical devices, the status of which are set as a function of the lifeboat serviceability. By initiating a polling process to determine a lockout condition, including communicating with, and receiving an acknowledgment from, a controller at each of the lifeboats, each of the controllers having a corresponding digital address unique to the corresponding lifeboat; responsive to receipt of the acknowledgment, transmitting a start code, to cause the computation of an algorithm to determine passenger logistics of assembling and being distributed to available lifeboats.

Serviceability includes a status that may (a) indicate the lifeboat 127 is ready and able to accommodate passengers or (b) is unable to be launched as a lifeboat 127 due to some mechanical or electrical malfunction. The case that the lifeboat 127 is disabled for any reason it is considered a lockout. A lifeboat is determined to be inoperative, either through (1) a lockout of its operating mechanism and an automatized sensing mechanism that confirms the lockout, or (2) through the notification of a crewmember, thus placing it out of service. During a lockout, the system 100 has access to the mechanisms, such as device, which transmits and thus reports the lockout status. The lockout status is stored in a database, and is used to decrement the number of lifeboats 127 available for service. For example, a lockout device may include a product that padlocks a boat's launch mechanism, while transmitting a Bluetooth signal. Such as device would constitute such a mechanism that transmits lockout status. By initiating a polling process to receive a signal such as the Bluetooth signal mentioned above, to determine a lockout condition, including communicating with, and receiving an acknowledgment from, a controller at each of the lifeboats, each of the controllers having a corresponding digital address unique to the corresponding lifeboat; responsive to receipt of the acknowledgment, transmitting a start code, it enables the computation of an algorithm, to be discussed below, to calculate and determine passenger logistics for assembling and being distributed to available lifeboats.

The inventive system and process utilizes the lifeboat serviceability combined with the status of associated muster locations, which allows the organization of servicing lifeboat into pairs. In one embodiment, each muster location may be serviced by multiple lifeboat, and in turn a single lifeboat may service multiple muster locations. In the latter case, the lifeboat capacity is subdivided, and each fraction is paired with the respective muster location.

In one embodiment of the invention, a muster/lifeboat pair is sequenced, determining the flow of people in evacuating the vessel. Lifeboat are generally sequenced from front of ship to back but can also be sequenced from front of ship to middle and back of ship to middle, depending on the physical location of "standby" survival crafts.

FIG. 1A of the present invention relates to a computer system 100 that provides for an interactive access control system for monitoring, identifying and accounting for individuals gaining access to a ship as well as mustering passengers during an emergency, including: a server computer 114 server, one or more databases, 120, 122, a plurality of mobile PDA 112a-112n, said server computer 114, databases 120, 122 and mobile PDA 112a-112n operable under one or more operating systems having application programs for registering individuals having access, and for mustering, tendering, verifying age, searching passengers, tracking triage, responding to incidents, tracking excursion events, tracking individuals such as children and clearing enclosed spaces. A tablet PC 106 in conjunction with server computer 114 provides for a replication of the server 114.

In the embodiment of the invention shown in FIG. 1A, system 100 has at least one platform server computer 114 to independently service multiple applications and multiple users utilizing work stations 110a-n, various Ethernets 128, 130, a communications network 111, to service mobile peripheral devices 112a-112n, such as personal data assistants and communications between one or more lifeboat 127 and a server computer 114, having among other systems and features, memory storage devices to store databases 120. The computer 114 has Internet connectivity generally. Additionally computer 114 is in further in communication with subsystem 113 that incorporates an internet information services module 116 operating in conjunction with a web application and web service application 124. The web application and web service application 124 connect provides connectivity between database 122 operation under the control of an SQL server and the database 120 through web synchronizer service module 118.

Each function within subsystem 113 may operate within the same computer 114 or on separate computers (not shown). It is not necessary that each computer is of the same operating system, or central processing unit (CPU) type. The computer 114, the work stations 110, the memory storage that incorporates database 122 operation, are under the control of an SQL server. The mobile devices 112a-112n each may include at least one CPU, and at least one communication port or hub, at least one random access memory (RAM), at least one read-only memory (ROM) and one or more databases or data storage devices (not shown). All of these later elements are in communication with respective system 100 CPUs to facilitate the operation of the system.

The computer 114 operates as a server to communicate with the work stations 110, database 122 operation under the control of an SQL server and the mobile devices 112a-112n as a distributed architecture, wherein databases and processors are housed in separate units or locations. The communications hub or port may have minimal processing capability itself, serving primarily as a communications router 126 establishing a corresponding link for communications 111 with the computer 114. A variety of communications transports and protocols may be part of the system by way of example, but not limited to: Ethernet, Bluetooth, NMT, GSM, UMTS, HTTP, SOAP and TCP/IP or any other communication means as developed in the future. The foregoing acronyms are well known to those of ordinary skill in programming communication devices for telephone systems, wireless, satellite and Internet application. In one embodiment of the invention each of the work stations 110a-n and computer 114 has an operating system such as the Microsoft Windows XP®, Linux®, Macintosh OSX® or any third party operating system. The operating system in each of the user machines need not be the same as long as it supports a web browser or other application to access the wide area network (WAN) or the Internet and supports the execution of codes to facilitate the intended media functions of the invention.

Figure 1B:
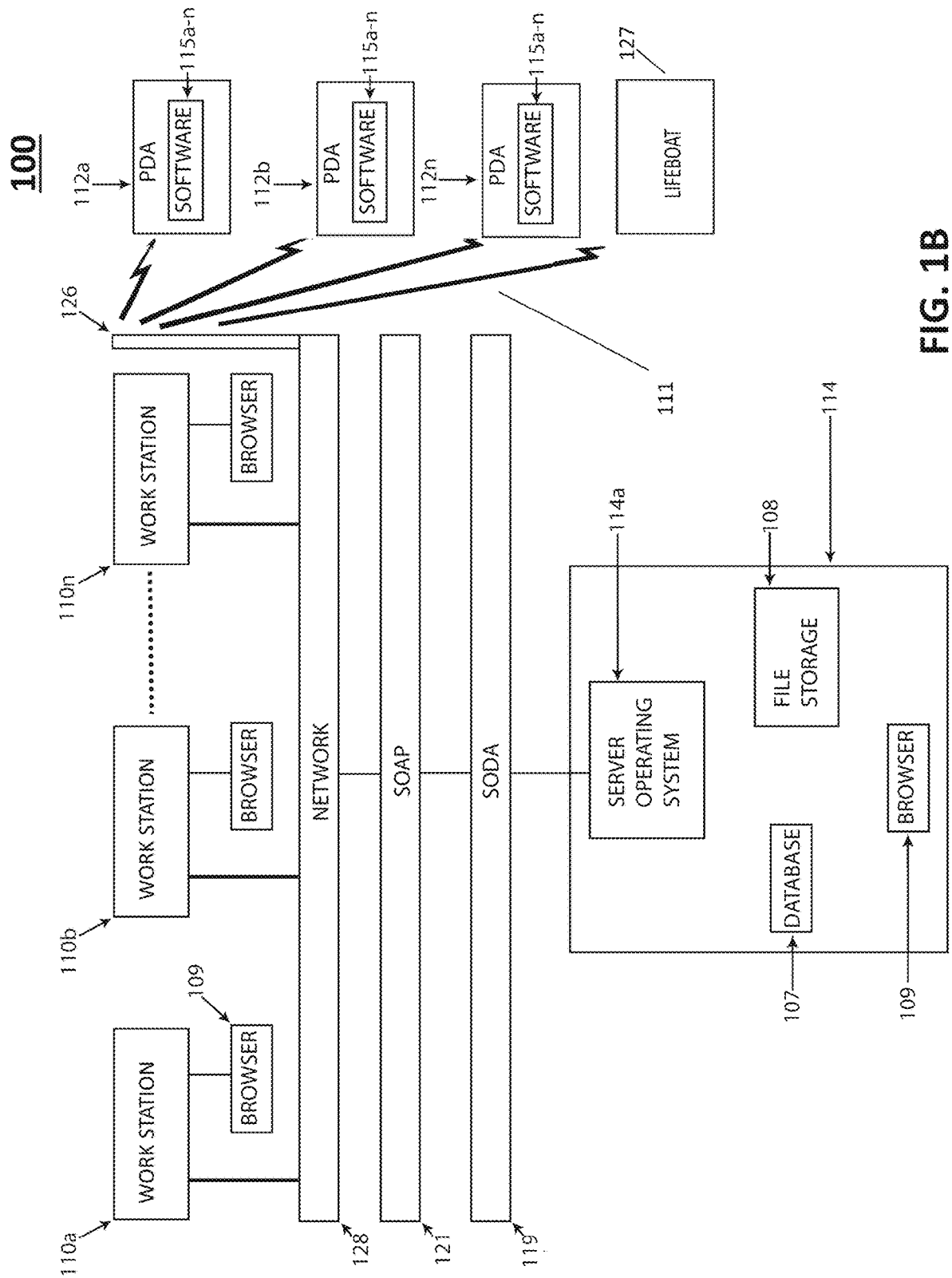
FIG. 1B is a block diagram of a system for mobile tracking and accounting of individuals according to an embodiment of the present invention.

The mobile devices 112a-112n are used to scan a identify any artifact carried by an individual having access to the closed community for, among other uses, registration or identification using a variety of identification technologies but not limited to magnetic stripe, barcode, RFID, biometric, facial recognition or any other technology used for the purposes of rapidly scanning or processing individuals. The mobile devices 112a-112n each have software referred to as the mobile client, which includes an executable software module that hosts all of the mobile application operation modes. The mobile devices communicate with a web service as hosted by the server computer 114 on an application server over a secured wireless network such as network 111. A web management application program includes a work station 110 for full system monitoring, configuration, and administration of the mobile units along with system reporting, through the facility of a browser 109 (FIG. 1B). The web management console 110 features unit remote communication capabilities for remote control and monitoring. The system 100 allows dynamic allocation of unit resources since the operation can be reassigned from the console.

The mobile client features a full SQL mobile database supporting an offline mode complete with automatic data synchronization through a proprietary 3-way data replication scheme. Once a PDA such as represented by 112a is in range of the wireless network (or inserted into a docking station), the system provides complete data replication and collision resolution across the system, enabling accurate and up-to-date reporting regardless of interruptions in networking. This enables operations like shore side tendering with photo identification, for example, were networking resources may not always be available.

The server computer 114 system 100 also has built-in redundancy that can be configured to run on a wireless tablet PC 106 (with ad hoc networking capabilities), the entire software system 114a resident on computer system 114 is made independently portably available as a computer system 106a on tablet PC 106. Operating system 106a manages a database 107a, file storage 108a and browser 109a as well as supports a communications protocol to communicate with network 128. Tablet PC 106 essentially operates as a replicated mobile server performing the functionality of server 114. This feature is especially important when full accountability for passengers and crew is needed, such as an emergency and during mustering, often under disastrous conditions.

By way of example and not limitation, the backend of the mobile client system may incorporate a Microsoft® SQL Server Express (Microsoft is a registered trademark of Microsoft, Inc., Redmond, Wash.) as the native database, however, it can support full SQL server for large data installations. The database synchronization service 118 provides a bidirectional gateway to ensure data synchronization between the database 120 and database 122 operation under the control of an SQL server. The server computer 114 can also provide connectivity to other shipboard systems through specially developed web services (not shown).

Referring to FIG. 1B, the present invention also relates to a device data linking library (DLL) interface that uses a single programming interface patterned after a service oriented device architecture (SODA) 119 layer common to all applications, where each application dynamically configures for communicating with devices assigned to a "role", allowing the dynamic substitution of devices of the same "role" type without changing any application source code.

Referring to FIG. 1B computer 114 server operates under an operating system 114a. Operating systems 114a manages a database 107, file storage 108 and browser 109 as well as supports a communications protocol to communicate with network 128. A simple object access protocol (SOAP) 121 layer represents a protocol specification for exchanging structured information between the server operating system 114a and the network 128 particularly with respect to the implementation of web services in a range of computer network applications. SOAP 121 relies on Extensible Markup Language (XML) as its message format, and usually relies on other application layer protocols (most notably Remote Procedure Call and HTTP) for message negotiation and transmission. SOAP 119 forms the foundation layer of the web services protocol stack, providing a basic messaging framework upon which web services are built.

With further reference to FIG. 1B, SOAP 119 a message sent to a web service enabled web site with the parameters needed for a search results in the site's return of an XML-formatted document with the resulting data. Because the data is returned in a standardized machine-parseable format, it is then possible to integrate directly into a third-party site. The SOAP 119 architecture consists of several layers of specifications for message format, message exchange patterns, underlying transport protocol bindings, message processing models and protocol extensibility. SOAP 119 is the successor of XML-RPC, though it borrows its transport and interaction neutrality and the envelope/header/body from elsewhere (e.g., from WDDX).

Again referring to FIG. 1B, all services as contained within the system 100 are equipment selected from the list to include server computer 114, work stations 110a-110n, PDAs or Intelligent Electronic Device (IED) 112a-112n. The work stations 110a to 110n communicate with each other and the computer 114 through the network 128. In the embodiment of the invention depicted in FIG. 1B, the work stations 110a to 110n communicate with the PDAs 112a-112n, via telecommunication channel 111, although there may be applications where the PDAs are stored in a docking stations, where the communication may optionally proceed over a wired network, such as an Ethernet 130 (FIG. 1A).

Figure 2:
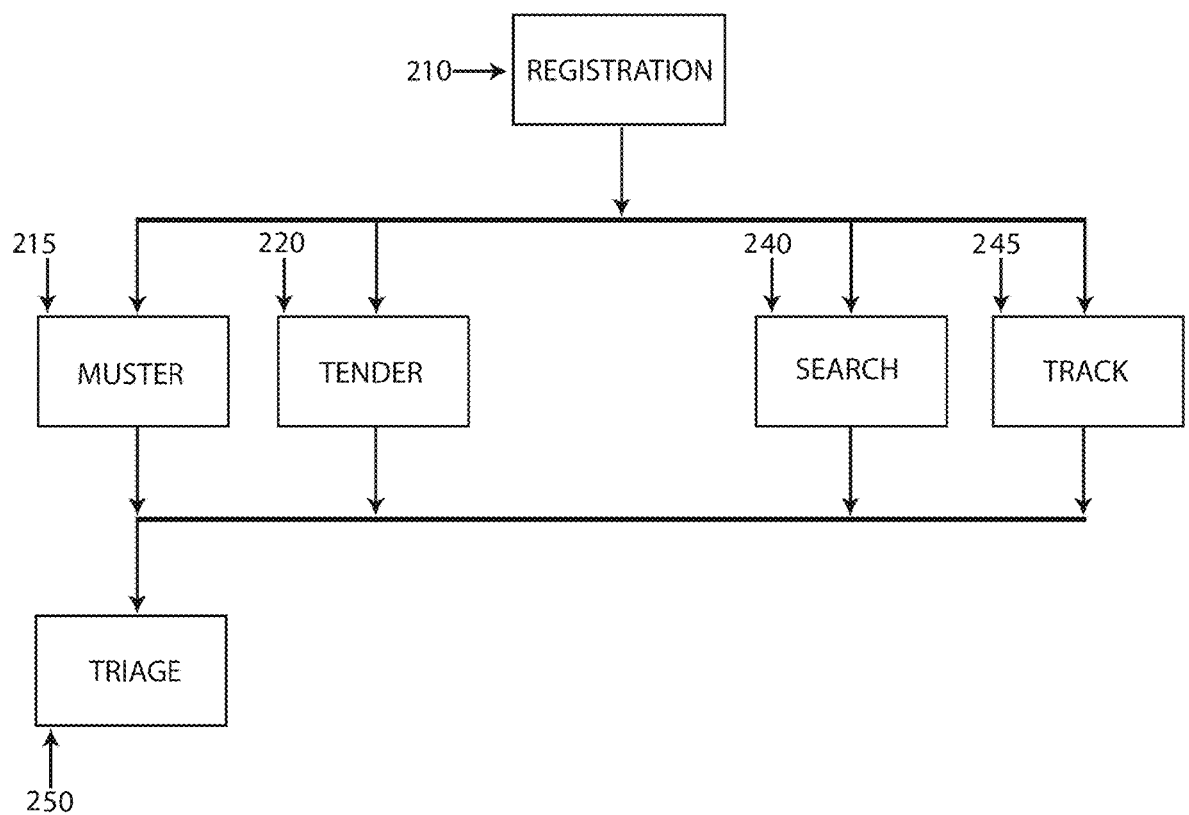
FIG. 2 is a block diagram of a method of mobile tracking and accounting of individuals to determine their absence or presence on board vessels according to an embodiment of the present invention.

FIG. 2 illustrates an embodiment of a method 201 of the invention as implemented on computer system 100 (FIG. 1) for providing interactive access control, monitoring, identifying and accounting for individuals on a ship, including: (A) utilizing mobile technology such as the PDAs 112a-112n for registering 210 individuals having access to the ship; and utilizing said mobile technology for (B) one of (1) operating a mustering system 215c, (2) operating a tendering 220 passengers system, (3) for operating an age verification system 230 of passengers, (4) for operating a tracking system 245, for (a) operating a triage system 250, (b) for operating a system for responding to incidents 255. Utilizing said mobile technology such as PDAs 112a-112n includes loading into the mobile device memory, data for registering individuals; and loading into a mobile device memory, data for the foregoing systems related to mustering, tendering, and tracking.

Returning to FIG. 1A and FIG. 1B, the computer 114 may be configured in many different ways. For example, it may be a conventional standalone computer providing the function of server located on a ship. However the server computer 114 may also communicate or act in the capacity of a peripheral server in system 200 (see, FIG. 4) that may include computers, the data from which is distributed across multiple computing systems and architectures, as is well known to those of ordinary skill in the art of designing computer architectures and networks. In one embodiment of the invention, the system 200 (FIG. 4) having a server 144 may be based on land at a headquarters facility. The server communicates with at least one shipboard system 100 as hereinbefore descried. System 100 communicates with the server 144 via a telecommunication/satellite transmission channel 139 that in turn utilizes the internet 142 to establish communication contact with the server 144 and additionally through the internet 142 contact with other devices 132a-132n that may be employed on other modes of transportation. The network as configured in FIG. 1A and FIG. 1B, permit a range of management options such as registration of passengers from remote locations such as represented by the devices 132a-132n. The communication between the shipboard system 100 and the land based system 144 permit the land based system to remain in communicative contact during emergencies, as well as during the execution of non emergency standard operating procedures such as registration of passengers and mustering.

Figure 3:
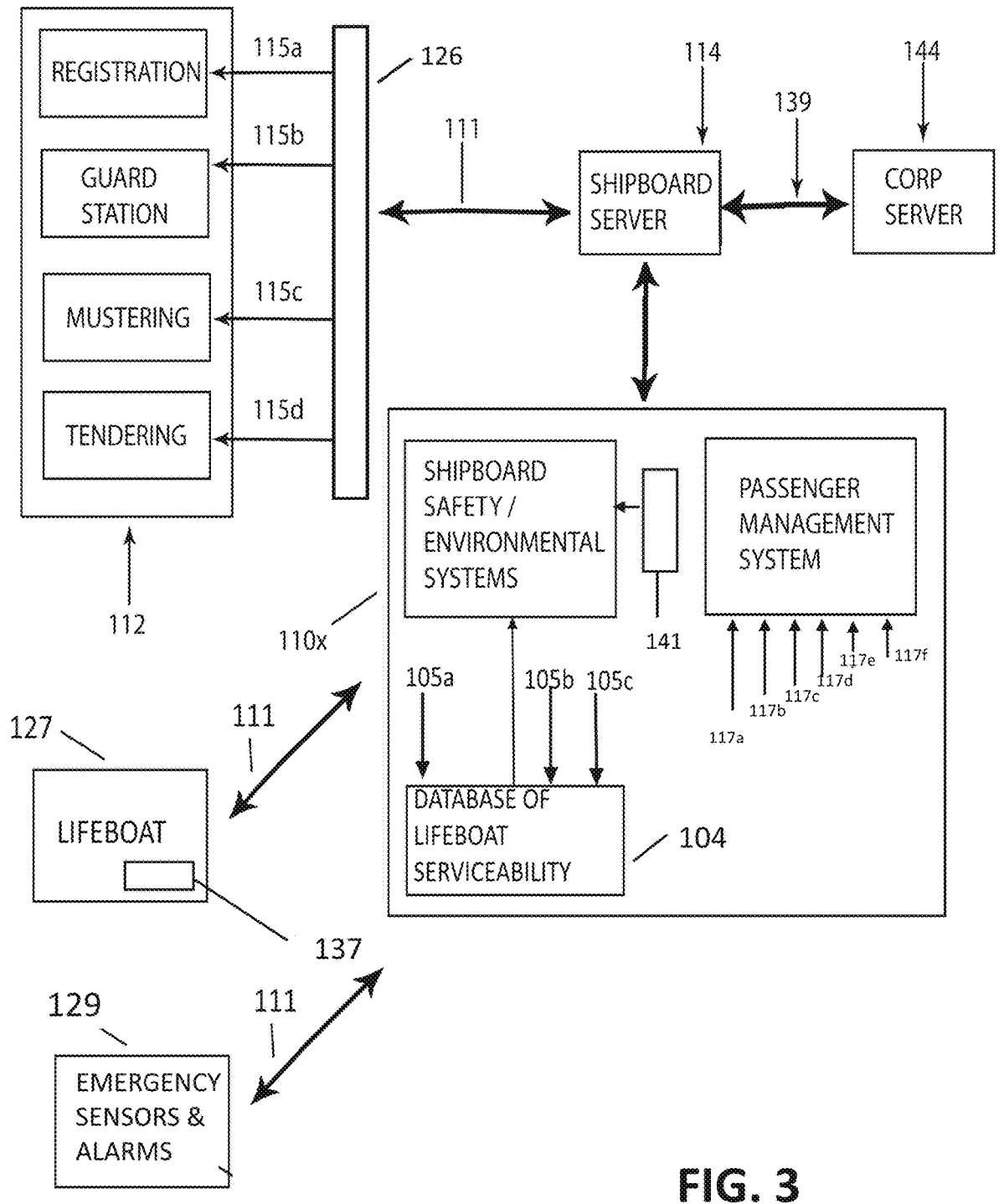
FIG. 3 is a block diagram of a system for mobile tracking and accounting of individuals according to an embodiment of the present invention.

FIG. 3, discloses one non limiting embodiment of the invention for accessing a lifeboat including identifying and accounting for individuals needing access to a lifeboat 127 having one or more CPUs, one or more databases, a plurality mobile PDA, a receiver located in work station 110 or PDA 112, for sensing a lockout condition, a register 141 to decrement the available space stored in database 104, in a lifeboat dependent on a received lockout condition, at least one of the CPUs having a program for accounting for passengers, who require access to a available space on a lifeboat, mustering and re-routing the passengers to muster stations based on available space, and assigning them to a lifeboat, dependent on an algorithm, to be further discussed below, that assigns passengers to available space on a lifeboat 127, so that in the case of an emergency, when one or more lifeboats are in a lockout condition, passengers will be safely and expediently assigned to fillable space on a serviceable lifeboat.

Referring again to FIG. 3, an aspect of the computer system 100 includes the server computer 114 server, in communication with PDAs 112 through a communications subsystem, such as by way of example, router 126. A typical PDA 112a-112n, such as PDA 112 depicted, includes one or more software modules 115 for achieving the objectives of the invention such as modules for registering individuals 115a, operating as a virtual guard station 115b, mustering service 115c, and tendering service 115d. The PDA 112 having the forgoing software modules 115 to achieve the functions indicated, in conjunction with the server computer 114, permits complete mustering, tendering, and responding to incidents. In addition to the mobile PDAs 112a-112n, subsystems, locatable work in the stations 110a-110n, such as work station 110x, include software modules to carry out various functions for achieving the objectives of the invention. By way of example, such functions are: registering individuals 117a, operating as a virtual guard station 117b, front desk 117c, incident reporting 117d, web reports 117e, and system administration 117f (117a-117f, collectively referred to as 117). The work stations 110a-110n, including 110x, each have identical software modules that work in conjunction with the server computer 114, and the PDAs 112a-112n, such as PDA 112. These identical software modules permits complete mustering, tendering, tracking triage, and responding to incidents from any PDA or work station. By way of example and not limitation in one embodiment the work station 110x work in cooperation with server 114, to implement the function of the ship board safety/environmental systems and management system functions, respectively. Programming to achieve mustering, tendering, tracking triage, and responding to incidents, is well known by those of ordinary skill in the art of programming databases, real time operating systems and telecommunications between various computers in a distributed mobile environment. Work station 110x has inputs from various shipboard locations that alert it as to the availability and serviceability of the lifeboat 127.

Figure 4:
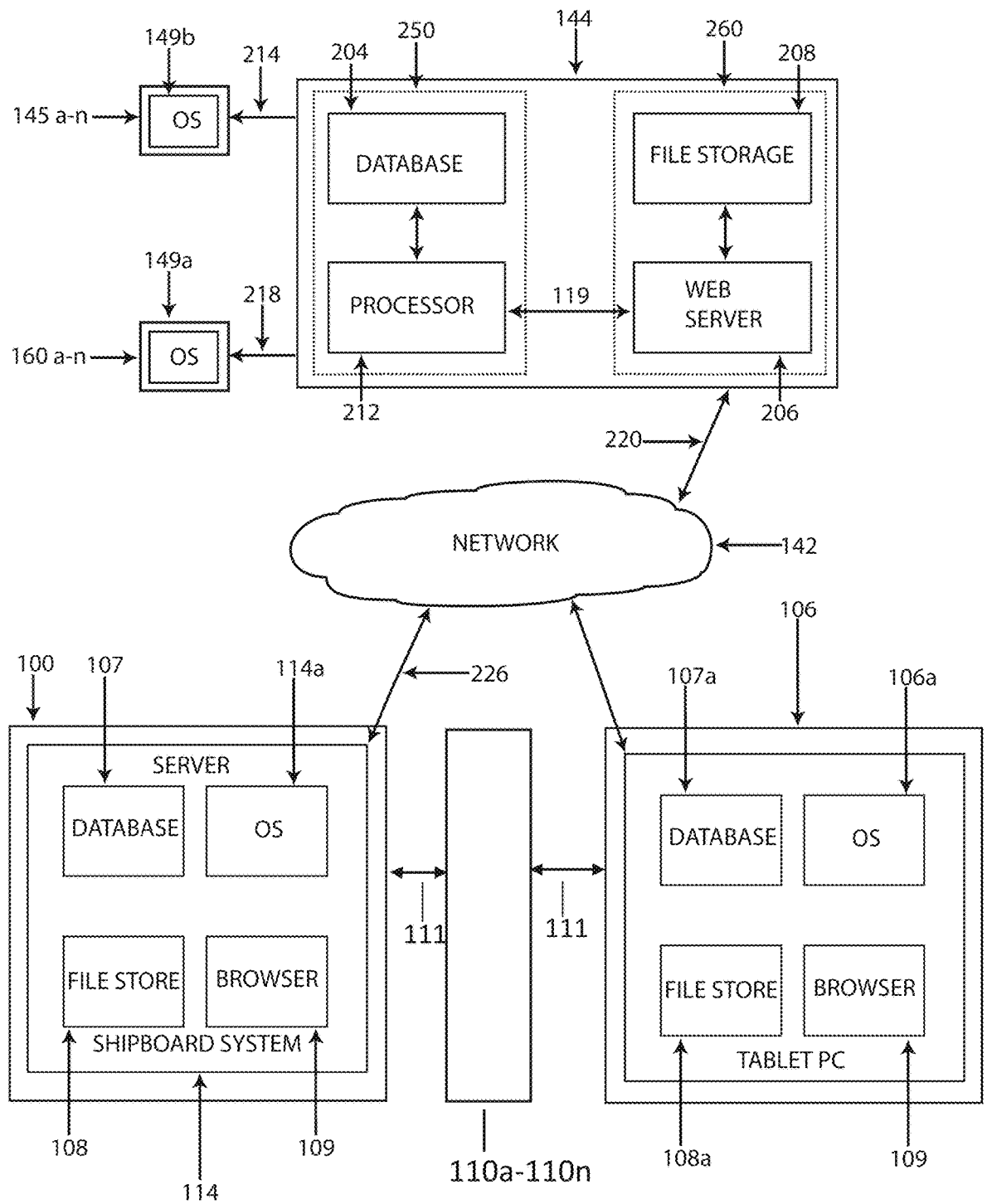
FIG. 4 is a block diagram of a system for mobile tracking and accounting of individuals according to an embodiment of the present invention.

FIG. 4 illustrates system 200 incorporating the system 100, the latter configured to communicate with server 144 as described in FIG. 1A, and FIG. 2. Server 144 communicates with one or more land based work stations 145 that provide ancillary management services for not only one such system 100, but a fleet of ships each having a system 100 on board. The computers 145 in communication with server 144 over network 150a perform functions such as incident reporting and management 145d.

In FIG. 1A through FIG. 4, each of the computers (i.e., 114, work stations 110a-110n . . . 110x, 144, 160a-160n, 170), PDAs 112a-112n, and optionally the lifeboat 127, include a CPU, such as one or more conventional microprocessors and optionally one or more supplementary co-processors such as math co-processors (collectively "processors"). Any lifeboat 127, has at least a processor (not shown) for communication over network 111. All processors are typically in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The PDA 112 processors and work station 110 processors are also in communication with one or more data storage devices. The data storage devices may comprise an appropriate combination of magnetic, optical and/or semiconductor memory, and may include, for example, RAM, ROM, flash drive, an optical disc such as a compact disc and/or a hard disk or drive. The processors and the data storage devices each may be, for example, located entirely within a single computer, PDA, IED or other computing device; or connected to each other by a communication medium, such as a USB port, serial port cable, a coaxial cable, a Ethernet type cable, a telephone line, a radio frequency transceiver or other similar wireless or wired medium or combination of the foregoing.

The data storage devices may store, for example, (i) a program (e.g., computer program code and/or a computer program product) adapted to direct the processor in accordance with the present invention, and particularly in accordance with the processes described in detail hereinafter; (ii) a database adapted to store information that may be utilized to store information required by the program. The database includes multiple records, each record including fields specific to the present invention.

The program may be stored, for example, in a compressed, an uncompiled and/or an encrypted format. The instructions of the program may be read into a memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as any alternative embodiments of the invention. The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor.

The system 100 busses carries the data to main memory, from which the relevant processor retrieves and executes the instructions. The instructions received by main memory may optionally be stored in memory either before or after execution by the relevant processor. In addition, instructions may be received via a communication port as electrical, electromagnetic or optical signals, which are exemplary forms of wireless communications or data streams that carry various types of information.

Referring again to FIG. 4 the corporate system 200, server 144 may include a data storage device such as file storage 208 which includes a hard magnetic disk drive, optical storage units, CD-ROM drives, or flash memory. Computer system 250, 260 of the present invention may also interact and/or control one or more user devices or terminals (e.g., 145a-f, 160a-c, FIG. 4). The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

The system 200 (FIG. 4) further includes of a host server 212 in synchronous communication with one or more user machines (e.g., 145a-f, 160a-c). In an embodiment, the host is a server in communication with a database 204; where the host is also in communication with a web server 206 that communicates with a file storage 208. The database 204 can be in a separate server, or can be part of the host server 212 within the same computer system 250. Similarly, the web server 206 and the file storage 208 can be separate units or can be integrated into a server 260. The physical location of the database 204, file storage 208 and the method of writing the machine executable codes being integrated into the host server 212 is not important to the invention as long as the functions are accessible to the host 212 and to the user machines or terminals (e.g., 145a-f, 160a-c).

In one non-limiting embodiment, each of the user machines (e.g., 145a-f, 160a-c) have an operating system (e.g., 149a, 149b) respectively, such as the Microsoft Windows XP®, Linux®, Macintosh OSX® or any third party operating system. Macintosh is a registered trademark of Apple, Inc. The operating system in each of the user machines (e.g., 145a-f, 160a-c) need not be the same as long as it supports a web browser or other application to access the internet and supports the execution of codes to facilitate the intended media functions of the invention. The network 220 and the corresponding links 214, 218, 119 are part of a Wide Area Networks (WAN), Local Area Network (LAN) through Ethernet connections or wireless connections. Yet in other embodiments, the network and the links can be Local Optical Networks (LON) or direct fiber optic links or direct terminal connections or plain old telephone service (POTS). In all forms of link communications within the network 142, the communications can be enhanced with known encryption protocols to improve security.

A Preferred Embodiment

Figure 5:
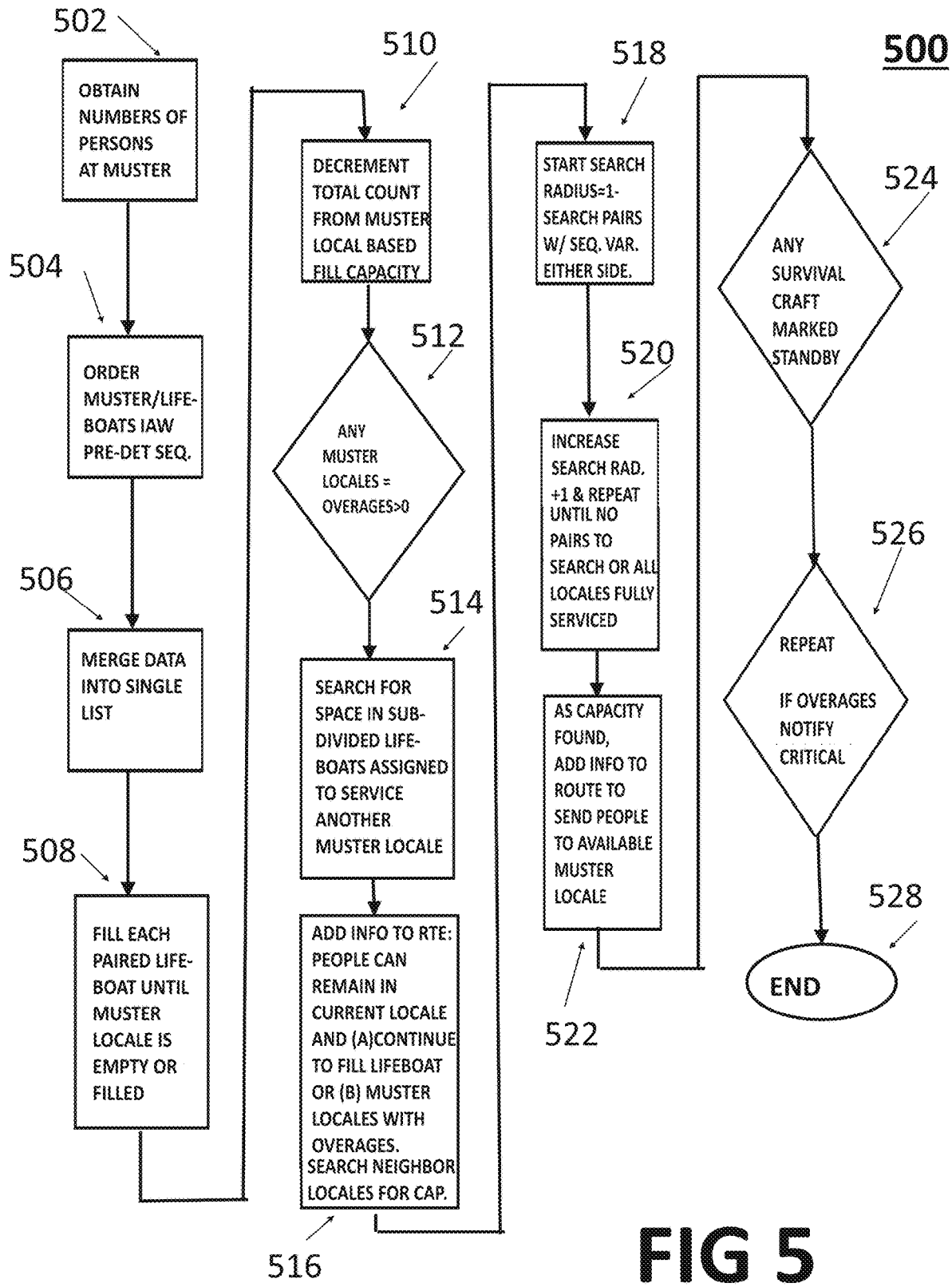
FIG. 5 is a flow chart of a method of mobile tracking and accounting of individuals to determine their absence or presence on board vessels according to an embodiment of the present invention.
Figure 6:
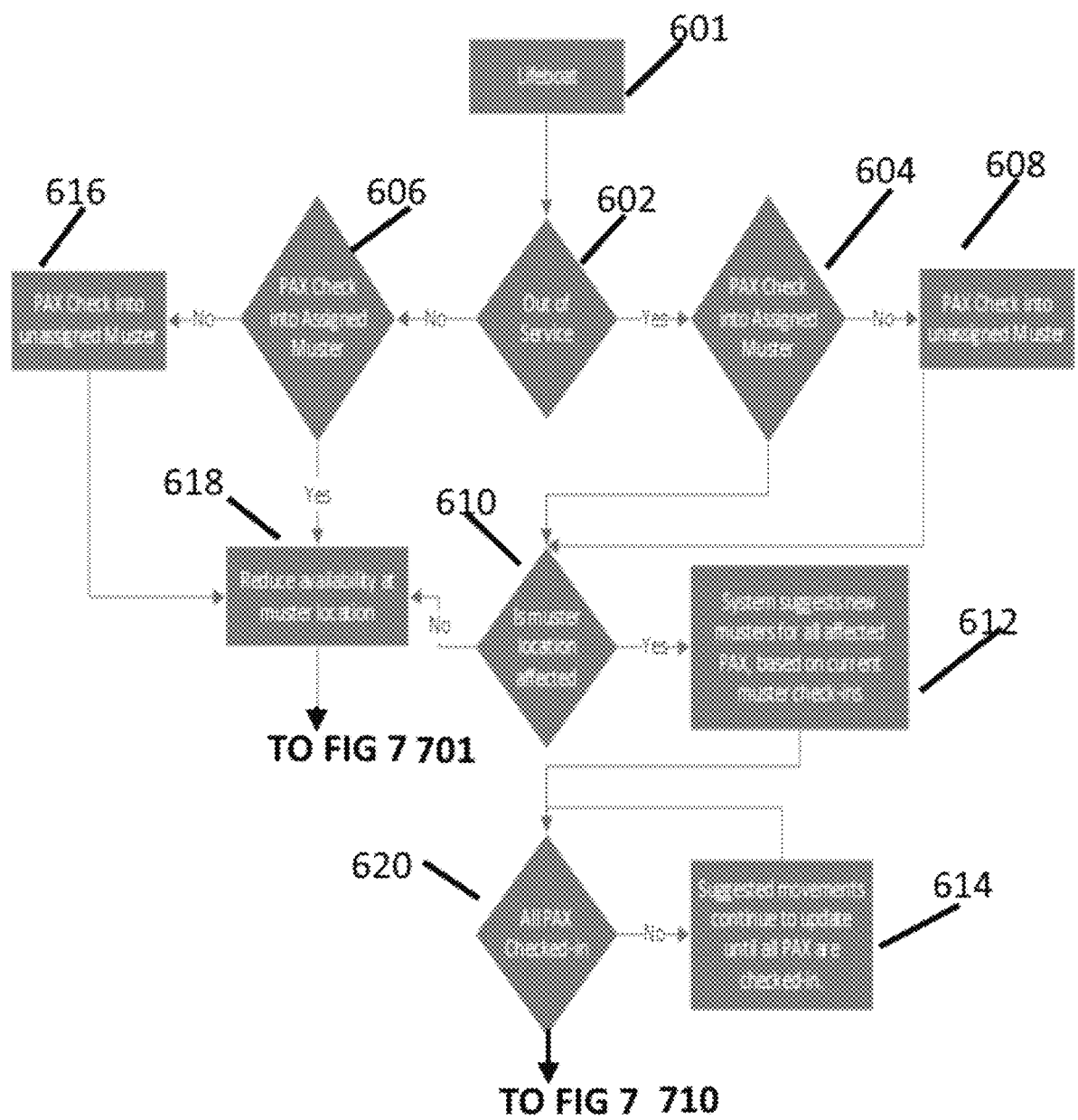
FIG. 6 is a flow chart according to an embodiment of the present invention.
Figure 7:
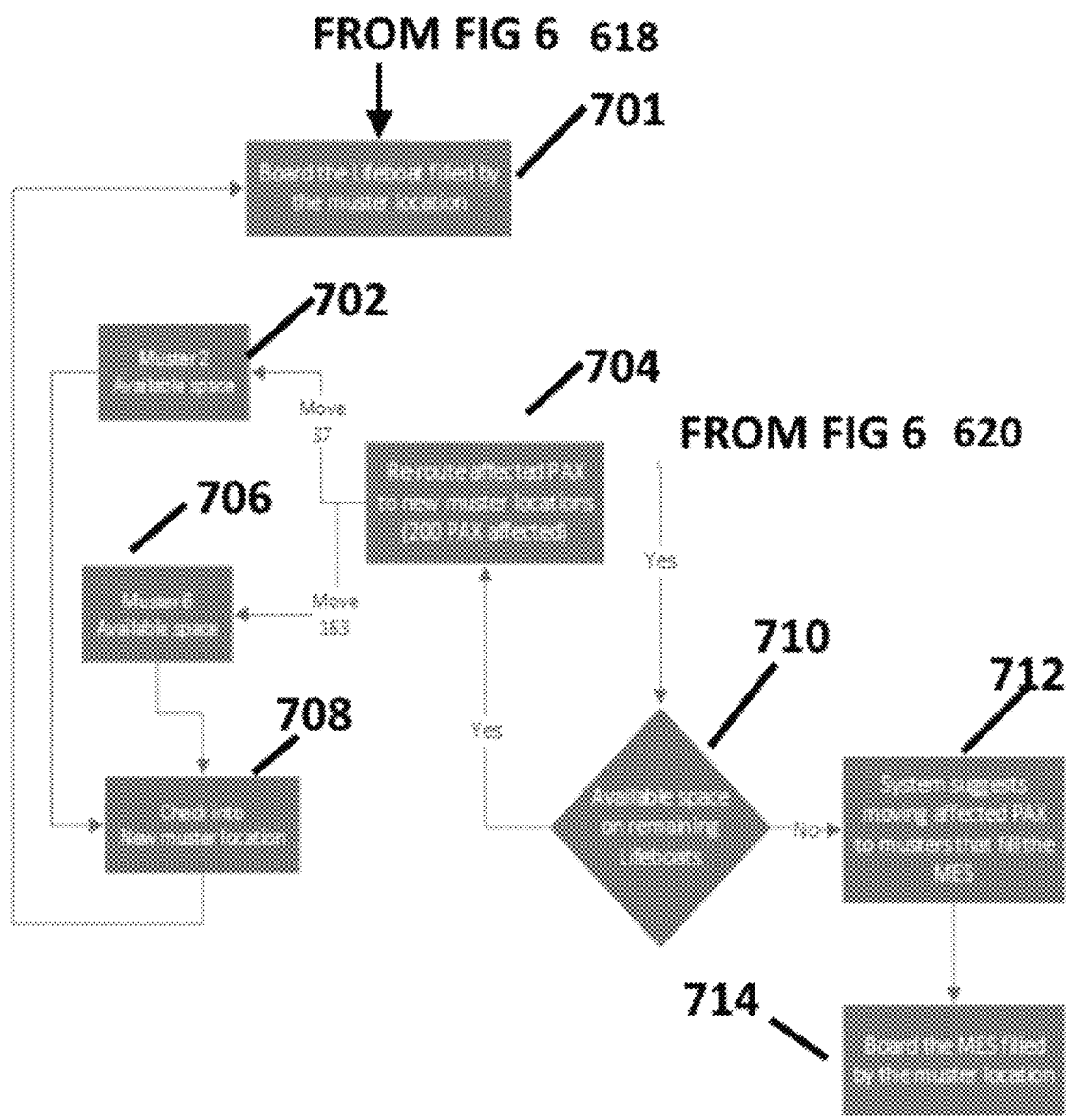
FIG. 7 is a flow chart according to an embodiment of the present invention.

FIG. 5, FIG. 6 and FIG. 7 depict flow charts of the system and method, and serve to illustrate the software logic as controlled by the lifeboat lockout mechanism and other considerations having to do with the mustering of passengers and filling of serviceable lifeboat 127. As disclosed herein, see FIG. 5, 500, with particular reference to a method for distributing passengers when lifeboat 127 are out of service as determined automatically or as notified by crew members. What follows the flow charts is a description of the implementation of the logic of the flow charts that allow the presentation of graphical user interfaces to crew members to assure the safe and required distribution of passengers onto lifeboat 127.

Once an emergency condition is initiated, an initiating signal is generated, (FIG. 3, 129) that sends the signal to a controller that transmits a lifeboat lockout condition, from any lifeboat if it is unavailable for service. An emergency initiating system, such as shown in FIG. 3, 129, includes a signal generator for sending the initiating signal, by way of example, e.g., via hardwire, wi-fi, or Bluetooth, to a controller, that typically is installed in a lifeboat, which transmits a lifeboat lockout condition. The initiating system 129 signal results from one or more of (1) sensors that actuate various alarms signaling the condition of electrical and mechanical systems aboard the ship, (2) fire alarms, (3) recorded emergency messages, (4) personal text messages during an emergency, (5) Emergency broadcasts over a public address system.

When an emergency comes to the attention of passengers and crew members, and through an initiating system, which as mentioned above, by way of example may include e.g., either via sensors that actuate alarms 129, such as fire alarms, or recorded messages, personal text messaging or announcements, all ship passengers and crew personal are required report to a mustering station. The emergency is what initiates the sub-systems to determine lifeboat availability.

An emergency that requires the evaluation of passengers for disembarkation from a ship, also necessitates an orderly process of assigning passengers to muster stations and ultimately the available lifeboat 127. The process is initiated via one or more crew members inputting a status into the system 100, through PDAs 112 or terminal 114, (See. FIG. 1A) or initiated automatically, based upon the emergency alarm initiating system 129, as embodied in sensors and alarms mounted throughout the ship. The initiating system 129 communicates with controller 137 directly (not shown) or through the work station 110x, in order to facilitate the interrogation of the possible existence of a lockout condition that is thereafter communicated to receiver 141 (See, FIG. 3).

Referring again to FIG. 3, work station 110x incorporates the ships safety/environmental systems and processes, which is in communication 111 with the lifeboat 127, and the ships emergency system of signal generators, sensors and alarms, collectively subsystem 129, and the shipboard server 114 to obtain data on the lifeboat 127 status, such as a lockout condition via device 137 that utilizes a controller to transmit the status of a lockout, as well as the status on emergency conditions signaled by the subsystem 129, all which will be received via register 141, and stored in database 104. The database 104 will be retrievable by the crew to make decisions and determine passenger mustering relative to any lifeboat 127 availability, based upon other things on the lockout condition, which requires that the inventory of lifeboat 127 be decremented by one lifeboat based on the content of a register within the receiver 141. Those of ordinary skill in programming such systems will appreciate that the state of the receiver may be sensed by the input/output bus of a microprocessor in 110x and thereafter decrement a register to account for a disabled lifeboat. Having recourse to the data on the availability of lifeboat serviceability, the system 100 can assist in automatically determine passenger mustering relative to any lifeboat 127 availability. Work stations 110x utilize database 104, which stores the lifeboat 127 (a) capacities and (b) their availability based on the lockout condition of lifeboat 127 among other factors. The (a) capacities and (b) availabilities are obtained and as required updated from one or more of: (a) data from the crew's manual update of lifeboat 127 service availability 105a; (b) automatically polled data 105b, obtained from lifeboat 127 electronic or electromechanical devices 137, having a controller for communicating, working in combination with lifeboat 127 launch mechanisms, which result in data about (1) capacities and (2) availabilities and conditions of the lifeboat 127 serviceability; (c) automatically pushed data 105c, obtained from lifeboat 127 electronic or electromechanical devices 137 having a controller for communicating, working in combination with lifeboat 127 processors, that report one or more of (1) capacities, (2) availabilities and conditions of the lifeboat 127 serviceability.

By way of example of obtaining when one or more lifeboat 127 are determined to be inoperative, the crew can change the status in database 104, i.e., update the stored lifeboat 127 (a) capacities, (b) availabilities information in the database 104, which in some cases will effectively place the one or more lifeboat 127 out of service. As will be discussed further the data pertaining to (a) capacities, (b) availabilities will be used to determine, new passenger muster assignments, and cause passengers to immediately be move to a new location, based on availability and proximity of other lifeboat 127.

The inventive system and process (FIG. 6, FIG. 7) utilize the lifeboat 127 serviceability data combined with the number of individuals at an associated muster locations, thus allowing the organization of servicing lifeboat 127 into pairs. In one embodiment, each muster location may be serviced by multiple lifeboat 127, and in turn an one or more single lifeboat 127 may service multiple muster locations. In the latter case, the lifeboat 127 capacity is subdivided, and each fraction is paired with the respective muster location.

In one embodiment of the invention, a muster/lifeboat pair is sequenced, determining the flow of people in evacuating the vessel. Lifeboat 127 are generally sequenced from front of ship to back but can also be sequenced from front of ship to middle and back of ship to middle, depending on the physical location of "standby" survival crafts.

The determination of where passengers should be mustered and prepared to board a lifeboat 127, is based on a method 600, which is executed in one of more of the system 100 processors, such as work station 100 or within a PDA 112. In some embodiments, part of the process based on method 600 is performed in PDA 112, and part performed in work station 100. How the tasks are divided is a design choice of the systems programmers. In a preferred embodiment the algorithm or method for determining how passengers are assembled, is executed in the processor associated with work station 110x. With reference of FIG. 5, the method 500 is a follows:

1. Obtain numbers 502 of all persons based on their current muster location;
2. Order muster/lifeboat pairs 504 by the pre-determined sequence;
3. Merge data 506 from previous steps (based on muster location) into a single, sequenced list;
4. For each muster location, in sequence order, "fill" 508 each paired lifeboat, until the muster location is empty or the lifeboat 127 is full;
5. Decrement total count 510 from each muster location, based on the filled capacity of each respective lifeboat 127;
6. Test 510 for any muster locations with overages, that is where the total count remains greater than zero;
7. Search 514 for remaining space in any shared (subdivided) lifeboat 127 that was meant to service another muster location;
8. NOTE: This allows people to remain in their current muster location and continue to fill the lifeboat 127, which is currently servicing the location;
9. Add 516 information to route that people can remain in their current muster location and can continue to fill the appropriate lifeboat 127 or any muster locations that still have overages, begin searching neighboring muster locations for remaining servicing lifeboat capacity;
10. Beginning with a search radius of 1, 518 search pairs with a sequence variance on either side of the current pair's sequence;
11. Increase the search radius by one, 520, and repeat until there are no longer pairs to search or all muster locations are fully serviced;
12. As lifeboat 127 servicing capacity is found, add information 522 to the route as a means to order people to the respective muster location that is serviced by each serviceable lifeboat 127;
13. Repeat step 6 for any survival crafts marked "standby" 524;
14. This includes inflatable life rafts, Marine Evacuation System, and any other type of survival craft meant solely for overcapacity situations like this;
15. If there are still muster locations with overages, 526 notify the operator of this critical situation.

Figure 8:
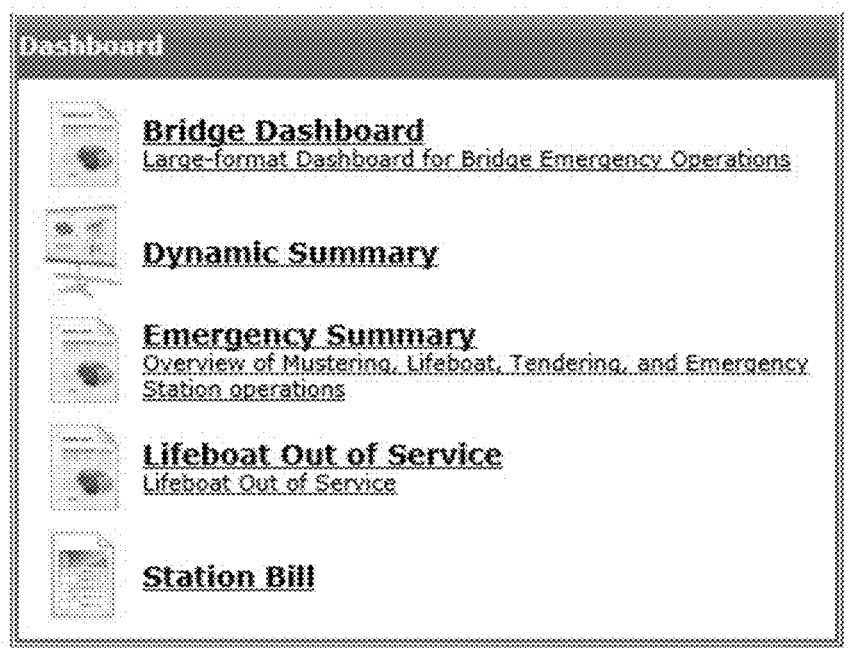
FIG. 8 is a graphical user interface for tracking and accounting of individuals to determine their absence or presence on board vessels to assign them to life boats according to an embodiment of the present invention.

FIG. 5, flow chart details the operation of the algorithm, which in one non limiting embodiment is described as shown in FIG. 6, FIG. 7 and FIG. 8. As illustrated below, a user access to a lifeboat 127, is noted as and Out of Service 601, 602, which is displayed on a dashboard, which requires permissions or an administrator login. A user logs-in depicted by way of illustration only, in FIG. 9. The user navigates to the FIG. 9 Control Panel, where users & Groups & Portals Groups are shown. Here the user can add users and permissions to an existing user group.

Figure 9:
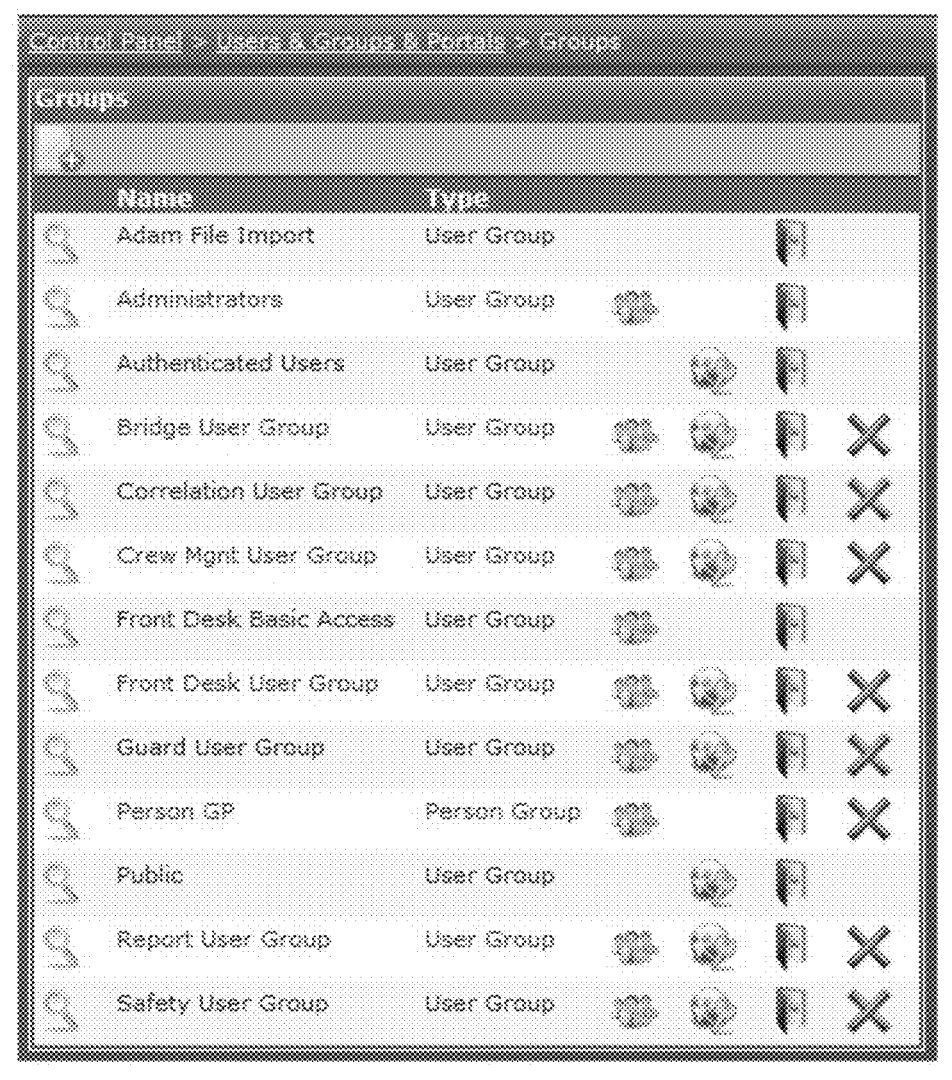
Figure 10:
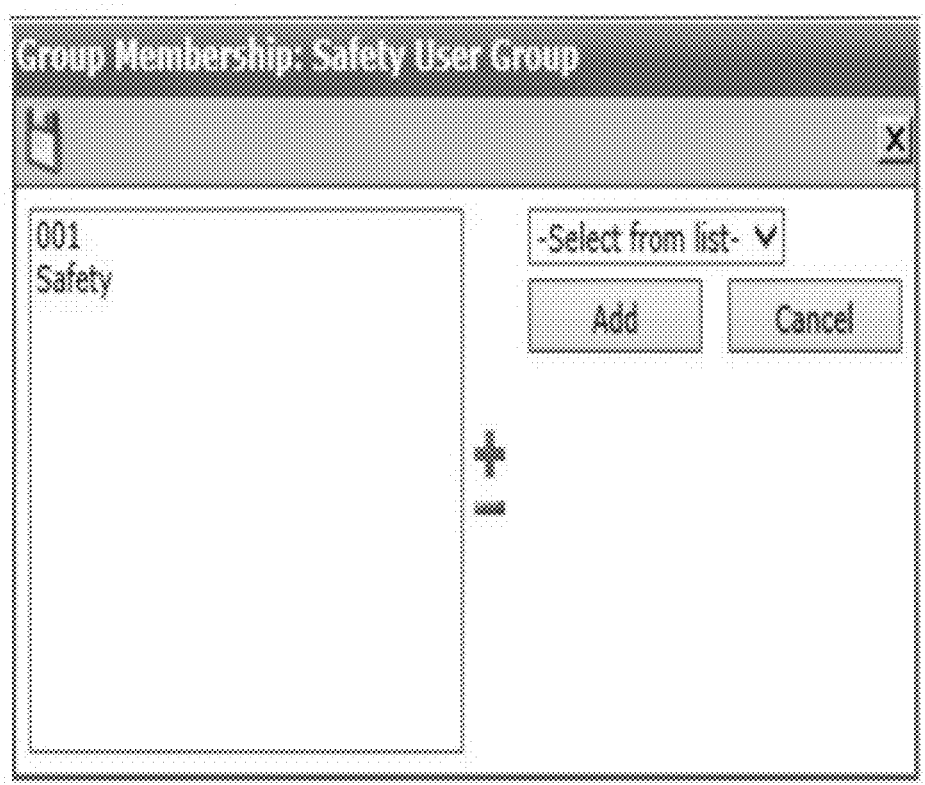
FIG. 10 is a graphical user interface for tracking and accounting of individuals to determine their absence or presence on board vessels to assign them to life boats according to an embodiment of the present invention.
Figure 11:
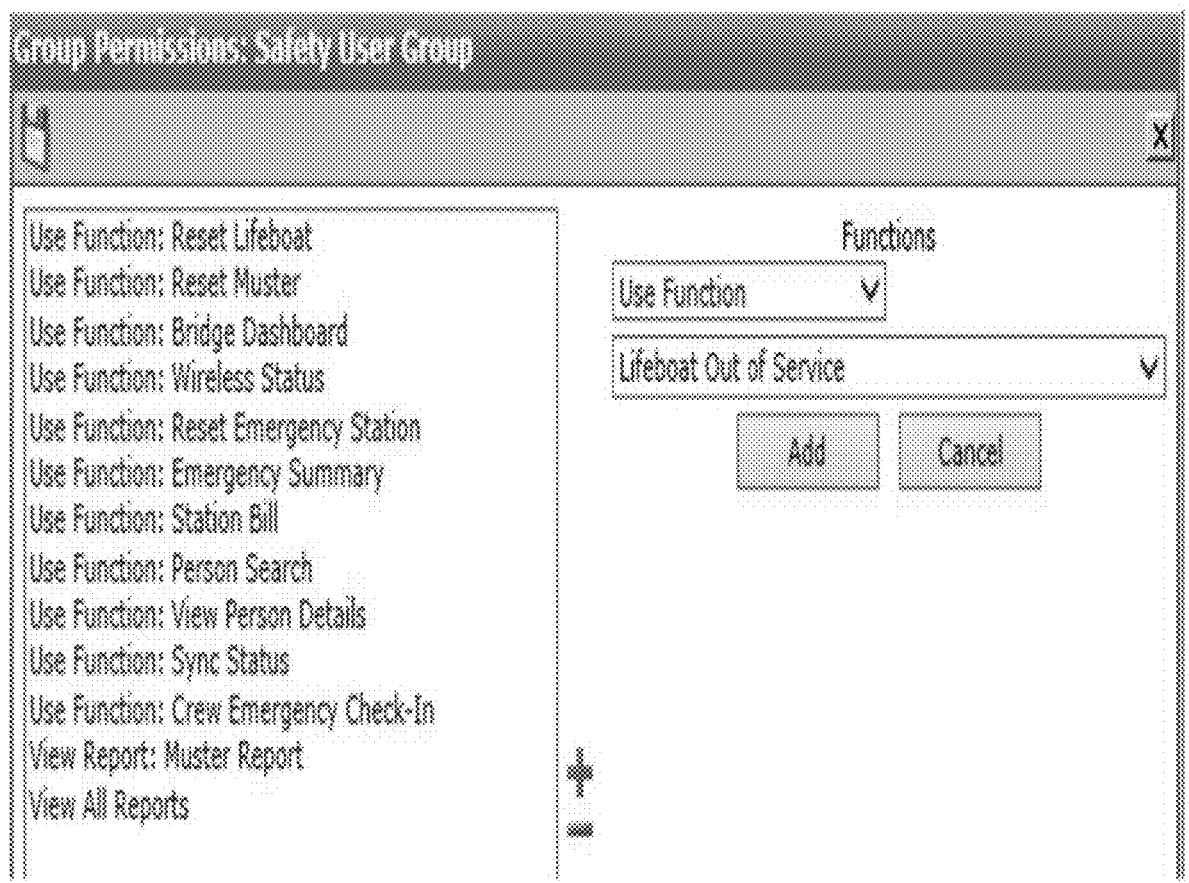
FIG. 11 is a graphical user interface for tracking and accounting of individuals to determine their absence or presence on board vessels to assign them to life boats according to an embodiment of the present invention.

The user can also add members to a the group, as in FIG. 9, FIG. 10, where for example, from the list of groups a user could select the group "d" 'Safety user Group' and click the members icon in the column adjacent to the column Type. In FIG. 10, the user clicks a plus sign symbol, then finds the user in the dropdown list, and then clicks the Add button and clicks the Save button to continue. The user clicks to select the user from the dropdown list, clicks add button to move to the left, Adding the Permissions to the Group. From the list of groups, it selects the recently created group 'Safety user Group' and clicks the Permissions icon. Turning to FIG. 11, the user clicks the plus sign, and the Functions dropdown list FIG. 11 appears. The user performs the following: 1. selects 'Use Function' in the top drop-down list; 2. a second drop-down will appear with a list of available functions; 3. select Lifeboat out of Service and click the Add button; 4. click the Save button to continue; locate the function d "Lifeboat Out of Service;" 5. verify that the user has access to the Lifeboat out of Service dashboard; 6. log out as the Administrator and log back in with the user recently granted access to the Lifeboat out of Service dashboard. Once logged in, click on the Dashboard option in the left Navigation Pane. The option for Lifeboat out of service should be visible. If so, the user has access.

Figure 13:
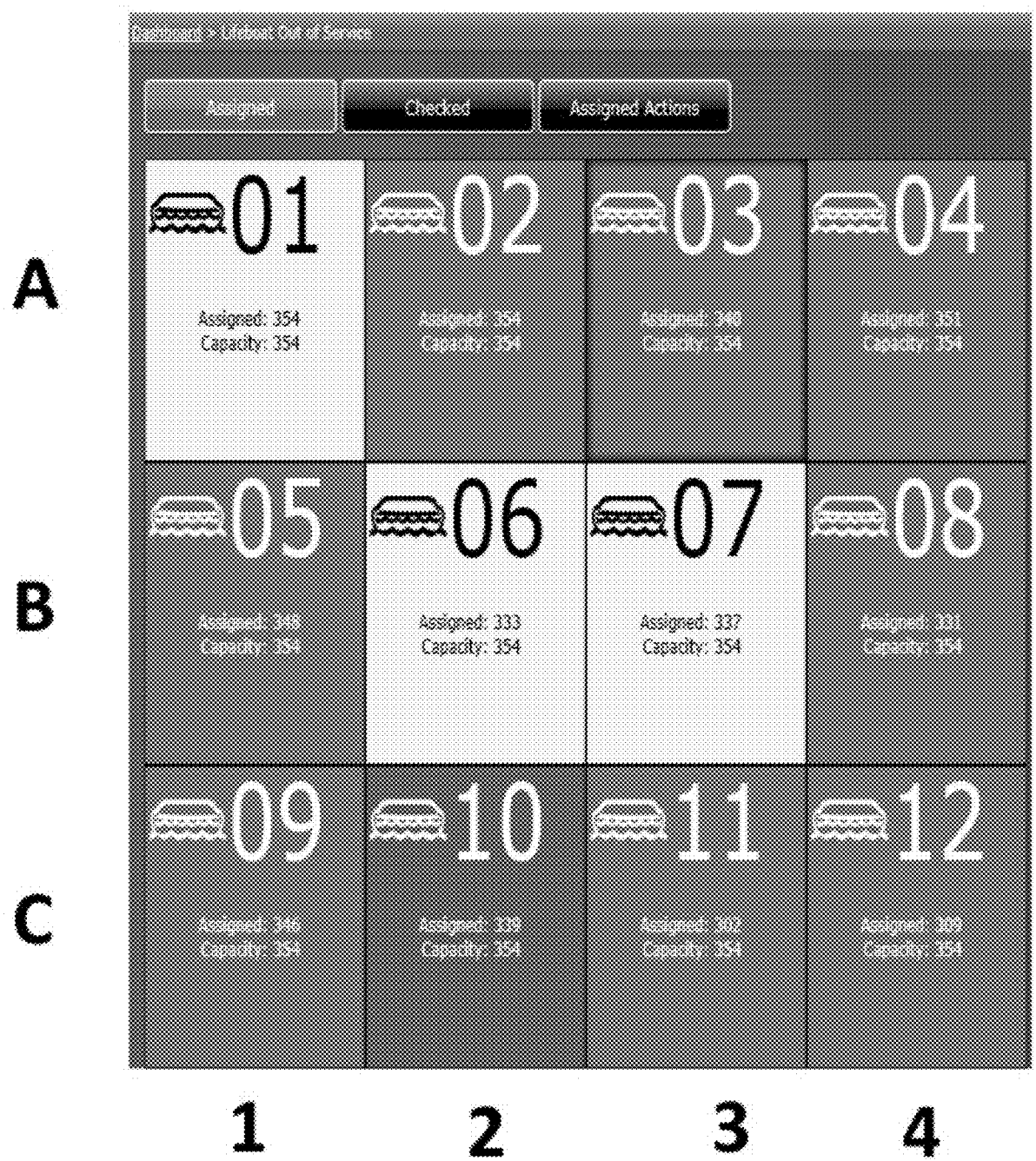
FIG. 13 is a graphical user interface for tracking and accounting of individuals to determine their absence or presence on board vessels to assign them to life boats according to an embodiment of the present invention.

The Passenger Distribution in Dedicated Assembly Stations use the display as shown in FIG. 13, wherein the user is responsible for providing this information in the panels corresponding to the intersection of A through C vertically, and 1 through 4 horizontally, which show how muster locations fill the lifeboat 127, which they are associated with. Each muster location has a predefined number of passengers who are guided to each of the lifeboat 127. It also shows the maximum number of passengers, as Capacity, that would fill a particular lifeboat from the muster location. Muster locations, i.e., lifeboat 127 that service the muster location.

The dashboard, FIG. 13, provides an overview on one page of the lifeboat capacities for all passengers, based on the ships evacuation routes (How the Muster Locations feed each lifeboat). Per FIG. 6, 606, 604, four different views are available: Assigned, Checked and (Assigned Actions or Checked-In Actions). Each view provides different information.

A red colored lifeboat (color not shown in figure) is an indicator that the lifeboat is out of service, FIG. 6, 602, and action is required for the muster locations that feed that lifeboat. A yellow colored lifeboat (color not shown in figure) is an indicator that an action is required for the muster locations that feed that lifeboat. The actions tab will display every muster location that requires an action. Checked Tab: Displays warnings for capacity issues based on passengers checking into muster locations. Assigned Tab: Displays warnings for capacity issues based on assigned passengers. The assigned and checked views display every lifeboat on the ship.

Figure 14:
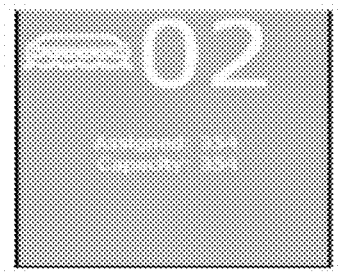
FIG. 14 is a graphical user interface for tracking and accounting of individuals to determine their absence or presence on board vessels to assign them to life boats according to an embodiment of the present invention.
Figure 14:
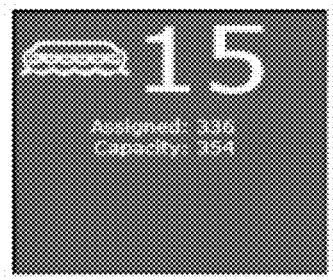
Figure 14:
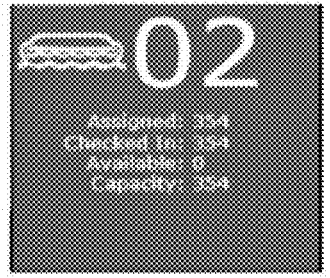
Figure 14:
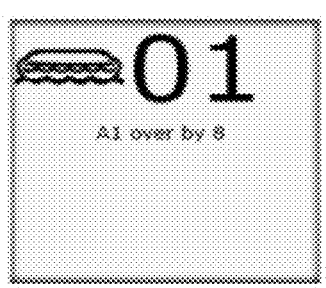
Figure 14:
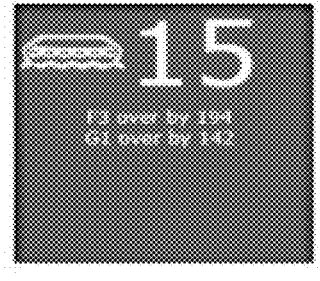
Figure 14:
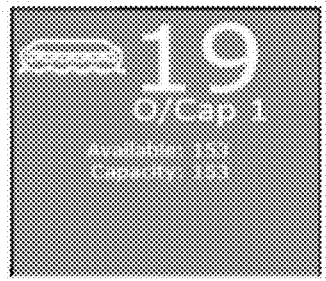
Figure 14:
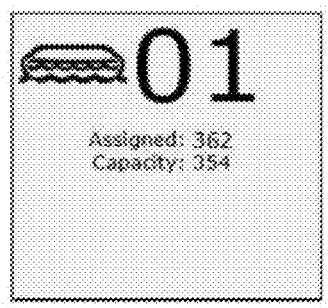
Figure 14:
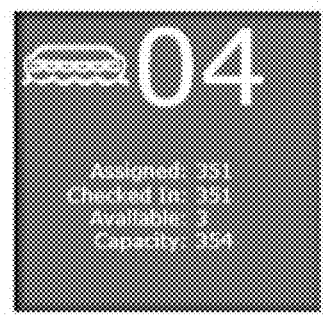
Figure 14:
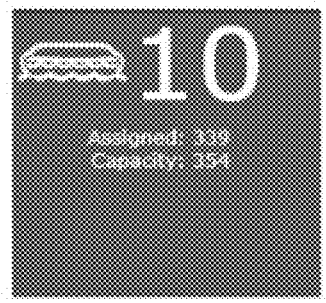
Figure 14:
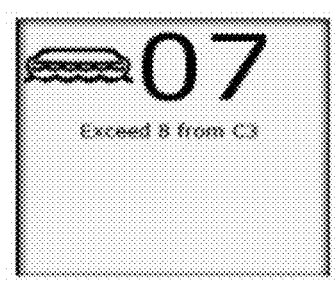
Figure 14:
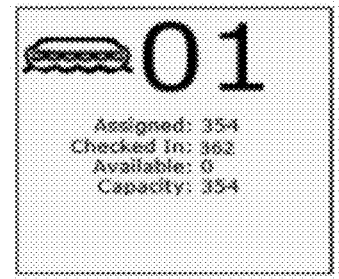
Figure 14:
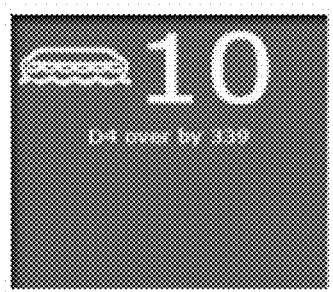

An assigned view FIG. 14, showing screen panels A through N, can be used to predict capacity issues caused by lifeboat 127 that are out of service or muster locations that are booked over capacity, prior to any passengers checking into a muster location. This view will display all of the lifeboat 127 on the ship. If a lifeboat is over capacity or out of service, the color of the lifeboat will change, indicating that an action is required. Safety officers can correct any capacity issues prior to an emergency, by reassigning passengers to muster locations that have seats on the lifeboat 127 they feed. This can be accomplished by updating the PMS or import files.

Assigned View Indicators, such as shown by way of example in FIG. 14, panel A having a numeral "02" to designate the lifeboat under review, and the "Assigned" to designate the number of passengers assigned to muster the location that occupies the "02" lifeboat, and the "Capacity" to signify the number of positions on the lifeboat available for passengers.

An Assigned View Indicator that is green (color not shown in figure) is an indication that the muster locations that fill the lifeboat will not exceed the capacity; therefore, no action is required.

A lifeboat that is yellow (color not shown in figure) can represent multiple warnings. If one or more muster locations that feeds a lifeboat are over the evacuation route capacity, there will not be enough seats to accommodate every passenger; therefore, the system will suggest moving passengers to the closest muster location(s) that have availability, as in FIG. 6, 612. In essence, the number of passengers assigned, FIG. 6, 604, 606, to a muster location that feed a particular lifeboat, exceeds the lifeboat's capacity. All suggested actions will display within the actions tab; and a user hovering over a lifeboat that is designated yellow will display summarized actions.

If a muster location exceeds the evacuation capacity and another muster location that feeds the same lifeboat is under capacity, the lifeboat will display a yellow (color not shown in figure) warning. In this scenario, the system accommodates the overage by displaying an action to exceed the evacuation route, rather than moving passengers to another muster location (FIG. 6, 614, 620). Hovering over the lifeboat will display this and provide the exceeded value.

A lifeboat that is red (color not shown in figure) is an indication that the lifeboat is Out of Service and, as a result the system will suggest moving passengers to the closest muster location(s) that have availability (FIG. 7, 702, 706, 708). The assigned counts are preserved. Once again, hovering over a lifeboat that is red, will display summarized actions, and represent the number of passengers and the muster locations that are affected (FIG. 6, 610).

In the case of an emergency, a checked view will be applicable as soon as passengers start checking into muster locations, FIG. 6, 616, 608. When an emergency occurs, there is no way to predict which muster stations the passengers will actually check into and, as a result, passengers will more than likely check into a nearby muster location and not the muster location they were assigned. Each muster location can accommodate a predefined number of passengers sent to a lifeboat or multiple lifeboat 127. The system will suggest moving any overages to muster locations that still have space on the lifeboat 127 that they feed. A lifeboat may be out of service prior to an emergency or placed out of service during one.

Similar to the assigned view, a lifeboat that is Green (color not shown in figure) as shown in FIG. 14 panel G, is an indication that the muster locations that fill the lifeboat will not exceed the capacity; therefore, no action is required. The system provides more information in the checked view as shown in the image FIG. 14 panel G by way of example: Lifeboat Name, 04; Checked In: Passengers checked into muster locations that feed this lifeboat, 351; Capacity: Capacity of the lifeboat for passengers, 354; Available: Seats remaining in the lifeboat after passengers checked-in, 3 (see, FIG. 7, 704, 710, 712).

A lifeboat that is Yellow (color not shown in figure) as shown in FIG. 14 panel H, is an indication of multiple warnings, as well on the checked view. If passengers checking into muster locations exceed the evacuation route capacity, the lifeboat will turn Yellow, indicating that an action needs to take place. By way of example, the number of passengers Checked into muster locations that feed Lifeboat 01, exceeds the lifeboat's capacity, is 362.

All suggested actions will display within the actions tab; however, hovering over a lifeboat that is yellow, will display summarized actions. Hovering over the image provides a summary of the problem, e.g., AI over by 8 passengers as shown in FIG. 14, panel B.

A lifeboat that is Red (color not shown in figure) as shown in FIG. 14, panel K, is an indication that the lifeboat is Out of Service; as a result, the system will suggest moving checked in passengers to the closest muster location(s) that have availability (FIG. 6, 618).

A lifeboat that is Orange (color not shown in figure) as shown in FIG. 14, panel L, is an indication that all lifeboat 127 have reached full capacity; as a result, the system will suggest deploying an additional life raft. The additional life rafts will continue to deploy as needed.

There is one tab for all of the actions, which dynamically changes between Assigned Actions and Checked in Actions. The mustering status will determine the actions displayed on the page. When passengers have yet to check into a muster location, the action tab will display as Assigned Actions. As soon as a single passenger checks into a muster location, the action tab will display as Checked In Actions.

Figure 15:
FIG. 15 is a graphical user interface for tracking and accounting of individuals to determine their absence or presence on board vessels to assign them to life boats according to an embodiment of the present invention.

The Assigned Actions View FIG. 15 displays the suggested movements of Assigned passengers. The images in the action views will be of muster locations, rather than lifeboat 127. Only muster locations that require actions are visible, so the system only present muster locations overbooked, exceeded evacuation capacity or affected by a lifeboat placed out of service. The muster location images include each suggested movement until no more overages exist. We also separate the suggested movements by port and starboard. The muster locations on the port side display in the left column and the starboard locations display in the right column to match the ship. Starboard Side is shown on the right column and Port Side on the left column.

Overbooking muster locations or a lifeboat out of service informs the user that the passengers located at muster D4 can successfully move to muster locations where seats are available (FIG. 702, 706) at their designated lifeboat 127.

When a muster location exceeds the evacuation capacity and another muster location, that feeds the same lifeboat, is under capacity, the exceed capacity scenario occurs. If this scenario occurs, the muster location in the Actions View will warn the user a shown in FIG. 16, panels A through C, that an action needs to occur. This information informs the user that the passengers at a muster location can exceed the evacuation routes capacity, rather than moving passengers to another muster location. The Exceed function, illustrated by way of example, informs the user that five more passengers than the evacuation route suggests, can be moved to lifeboat 06.

A Checked-In Actions View displays the suggested movements of Checked In passengers (FIG. 6, 616, 608, 620). The images in the checked-in actions view will be of muster locations, rather than lifeboat 127. Only muster locations that require actions are visible, so the system only presents muster locations where too many passengers have checked-in, exceeded evacuation capacity or affected by a lifeboat placed out of service. The images in this view will display the suggested movements of checked-in passengers from one muster location to another, until no more overages exist. Unlike the assigned actions view, as passengers are being mustered, the suggestions can and will change. Once all passengers check into a muster location, the system can accurately suggest where to move over capacity passengers. Moving the passengers too soon can create a scenario where passengers can move several times.

In Placing a Single lifeboat out of service function, a user with permissions can take a lifeboat out of service at any time. The user can navigate to the Lifeboat out of Service dashboard and locate the defective lifeboat, as the name of each lifeboat is visible within each image. Once located, clicking on the lifeboat will provide the user with an action message where they can choose to proceed or cancel.

If the users chooses to cancel, the message will close and no action will take place (The lifeboat will remain in service). If the user chooses to proceed, the message will close and the selected lifeboat will no longer be in service. The color of the lifeboat will change to Red, FIG. 14M, warning any user that the lifeboat is not in service and actions/movements will need to take place. Any passenger who was assigned or checked into a muster location that feeds that lifeboat, will need to move to another muster location that can accommodate more passengers. The system will determine where to move those passengers to, based on muster location proximity and lifeboat capacity.

Placing a lifeboat Out of Service will affect the PDA's as they will no longer display a lifeboat that is out of service. The PDA's used at the location where a lifeboat is out of service will still function; however, they will not have the ability to access the inoperative lifeboat. If a user logs into a PDA at that location, the unit will default to the nearest location in the list of lifeboat 127. Until the lifeboat is back in service, none of the PDA's on the ship will be able to select the inoperable lifeboat.

Placing a lifeboat out of service that has a one to one relationship, i.e., this scenario has a single muster location that fills an entire lifeboat. Taking a "One to One" lifeboat out of service affects a single muster location, which then needs to move passengers to other muster locations. The example FIG. 14, panel M, shows passengers who have an assigned status. Taking out lifeboat 10 will require moving all 339 passengers assigned to the muster location, to muster locations that have available space.

Once taken out of service, hovering over the lifeboat will display, FIG. 14, panel N, the single muster location and display the number of passengers affected at that location.

Navigating to the Assigned Actions tab FIG. 15 will display the affected muster location (D4) and provide detailed information. Herein the safety officer can view the probable movements of passengers, if all passengers checked into their assigned muster locations. If a lifeboat is out of service prior to an emergency, the officer can print an assigned muster report, for the muster location that is affected. The ship can reassign all of the passengers to the suggested muster locations. If an emergency occurs, the passengers originally assigned to a problem muster location know to report to muster locations that can accommodate them. Referring to FIG. 15, the sum of the passenger values equals 339.

Figure 16:
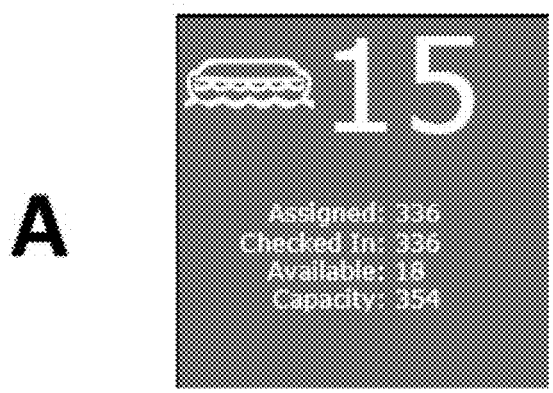
FIG. 16 is a graphical user interface for tracking and accounting of individuals to determine their absence or presence on board vessels to assign them to life boats according to an embodiment of the present invention.
Figure 16:
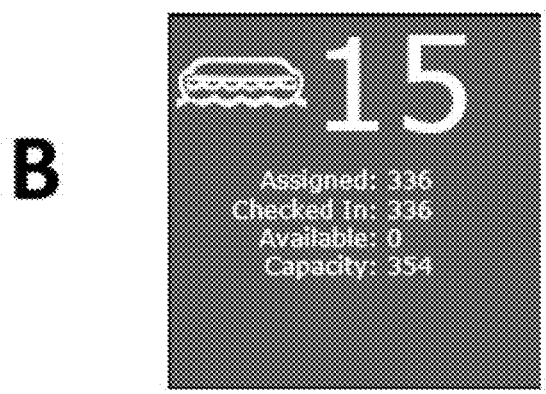
Figure 16:
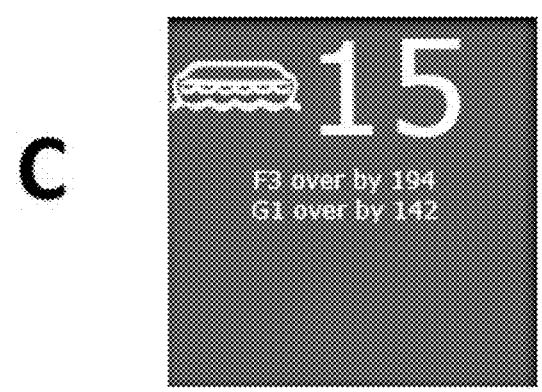

Placing a lifeboat out of service has one-to-many relationship, wherein several muster locations fill an entire lifeboat and wherein the muster locations do not feed any other lifeboat 127. Taking a "One to Many" lifeboat out of service will affect several muster locations, which then needs to move its passengers to muster locations that can accommodate them. The example FIG. 16 shows lifeboat 15 during an emergency scenario, where passengers are checking/checked into muster locations. Prior to taking out a lifeboat, FIG. 16A the system displays the remaining availability at the muster locations that feed it. Once the lifeboat is out of service, the availability is no longer relevant; therefore, we clear out the value.

Removing lifeboat 15 requires moving all 336 passengers checked into the muster locations, to muster at locations that have available space (See, FIG. 16, panel B). Once taken out of service, hovering over the lifeboat will display each muster location and the number of passengers affected at each location (See FIG. 16, panel C).

Figure 17:
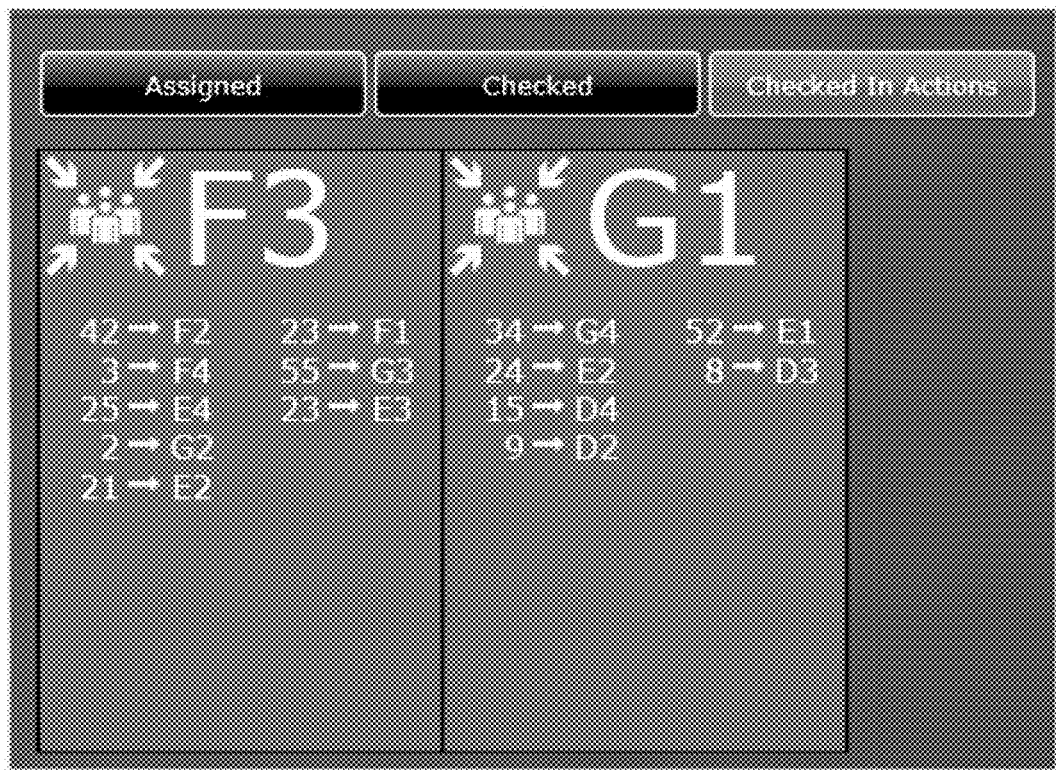
FIG. 17 is a graphical user interface for tracking and accounting of individuals to determine their absence or presence on board vessels to assign them to life boats according to an embodiment of the present invention.

Turning to FIG. 17, navigating to the Checked in Actions tab displays the affected muster locations (panel A, F3 and panel B, G1). Here, the safety officer can view the suggested movements of passengers. If a lifeboat is out of service during an emergency, the officer can utilize this information to communicate with crewmembers at the affected muster locations and advise them where to move passengers.

Adding all of the passengers' values will create a sum that matches the value of 336. Adding up the values displayed in muster location F3 will create a sum that matches the value displayed when hovering over the lifeboat. Lastly, adding up the values displayed in muster location G1 will create a sum that matches the value displayed when hovering over the lifeboat.

When a single lifeboat is out of service, several muster locations must feed one or more available lifeboat 127, i.e., the same muster location may feed other lifeboat 127. Taking a "Many to Many" lifeboat out of service will affect several muster locations.

In a multiple lifeboat scenario as described above, an overage to one or more lifeboat 127 must be taken into account. The system selects the last lifeboat assigned to any given muster location. In this case, if 03 were out of service; but 03 were also the last boat assigned to B3, it is deemed the one attributed to the overage. When using this logic for muster location B1, the last lifeboat assigned would be 05, so it would be the one attributed to the overage. In the exemplar table below, lifeboat 03 has a "Many to Many" relationship.

TABLE 1

| Lifeboat Out of Service Passenger Assigned or Checked In | Muster Location | Lifeboat | Maximum # of Passenger sent to the lifeboat. |
|---|---|---|---|
| 209 | B1 | 03 | 129 |
| 05 | | 86 | |
| 340 | B3 | 01 | 129 |
| 03 | | 225 | |

Figure 18:
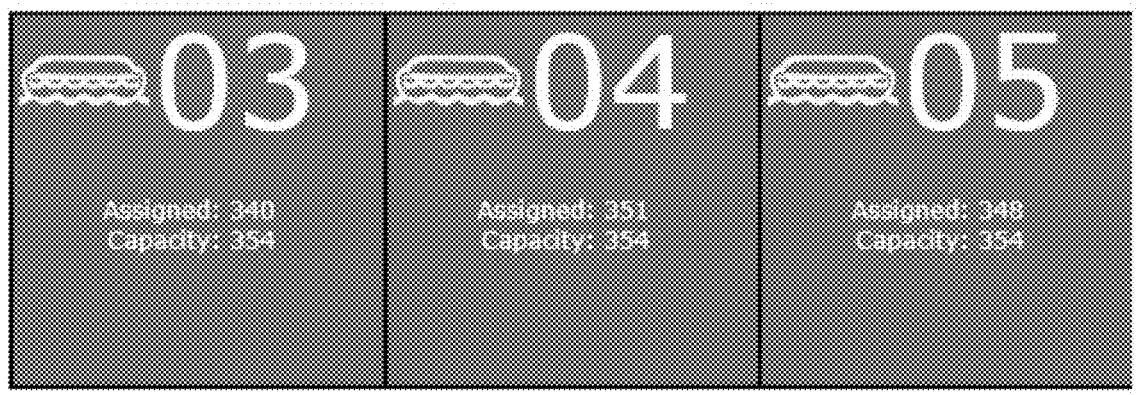
FIG. 18 is a graphical user interface for tracking and accounting of individuals to determine their absence or presence on board vessels to assign them to life boats according to an embodiment of the present invention.
Figure 18:
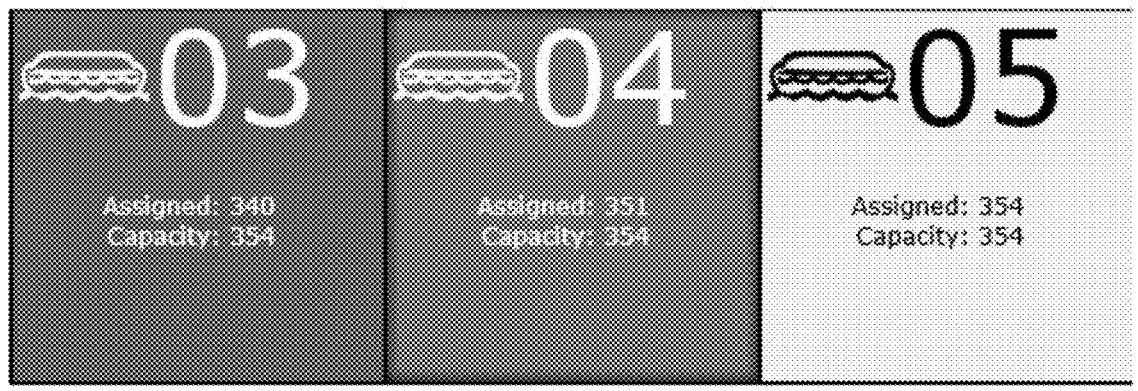

As shown in the above table, and FIG. 18, panels A, lifeboat 03 receives passengers from Muster locations B1 and B3. Lifeboat 127 05 and 01 also receive passengers from the same muster locations. If the maximum number of passengers sent to the functioning lifeboat 127 were not at maximum capacity, the system will fill those boats before suggesting any movements.

Muster location B1 sends passengers to lifeboat 03 and 05 and there are 209 passengers assigned to this location. If lifeboat 03 is out of service, all of the assigned passengers at location B1 will create a "one to one" relationship with lifeboat 05. The evacuation route defines the number of passengers from B1 that will fit on lifeboat 05. Lifeboat 05 can accommodate 86 of the 209 passengers assigned to B1. This leaves 123 passengers at B1 and represents the number of passengers that need a lifeboat with capacity.

Figure 19:
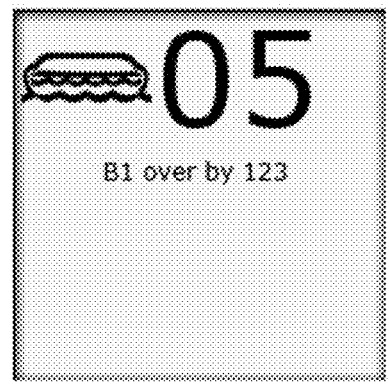
FIG. 19 is a graphical user interface for tracking and accounting of individuals to determine their absence or presence on board vessels to assign them to life boats according to an embodiment of the present invention.
Figure 19:
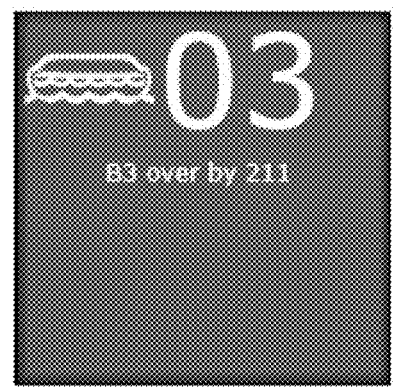

Lifeboat 05 is now Yellow, (color not shown), FIG. 19A, which indicates that there is an overage for this lifeboat. When hovering over lifeboat 05, FIG. 19, panel A, the system summarizes the number of passengers at location B1 that need to go to another location. The action tab will provide detailed suggestions.

When lifeboat 03 (FIG. 19, panel B) is out of service, muster B3 is also affected. B3 sends passengers to lifeboat 03 and 01. B3 has 340 passengers assigned. When lifeboat 03 is out of service, all of the assigned passengers at location B3 will create a "one to one" relationship with lifeboat 01. Unlike lifeboat 05 above, the suggested movements will display in lifeboat 03, when hovered. If lifeboat 01 had available seats, we would fill them prior to suggesting the movements of the remaining passengers from B3. Lifeboat 01 can accommodate 129 of the 340 passengers assigned to B3. This leaves 211 passengers at B3 and represents the number of passengers that need a lifeboat with capacity. Lifeboat 03 is now turns red, (color not shown), which indicates that the boat is out of service. When hovering over lifeboat 03, we summarize the number of passengers at location B3 that need to go to another location.

The system will allow users to place as many lifeboat 127 out of service as needed. When multiple lifeboat 127 are out of service, the suggested movements of passengers is more complicated, as the process attempts to find lifeboat 127 that have remaining capacity, within a reasonable proximity to the muster locations that are affected. The ability to suggest an adequate movement of passengers from one muster location to another will depend on the Capacity of the ship and the number of passengers that are sailing with it.

Taking a single lifeboat out of service will add the affected muster locations to the actions page and display the suggested movements for each location. When another lifeboat goes out of service, the suggested movements from the original lifeboat can change. This can happen when muster locations that suggested moving passengers to are no longer available when the second lifeboat went out of service. Additionally, the process may "grab" a newly affected muster location and distribute passengers before a previously affected muster location. In this case, the new muster location will find available muster locations for passengers first, so the other muster locations will move passengers to different locations, than previously suggested.

Figure 20:
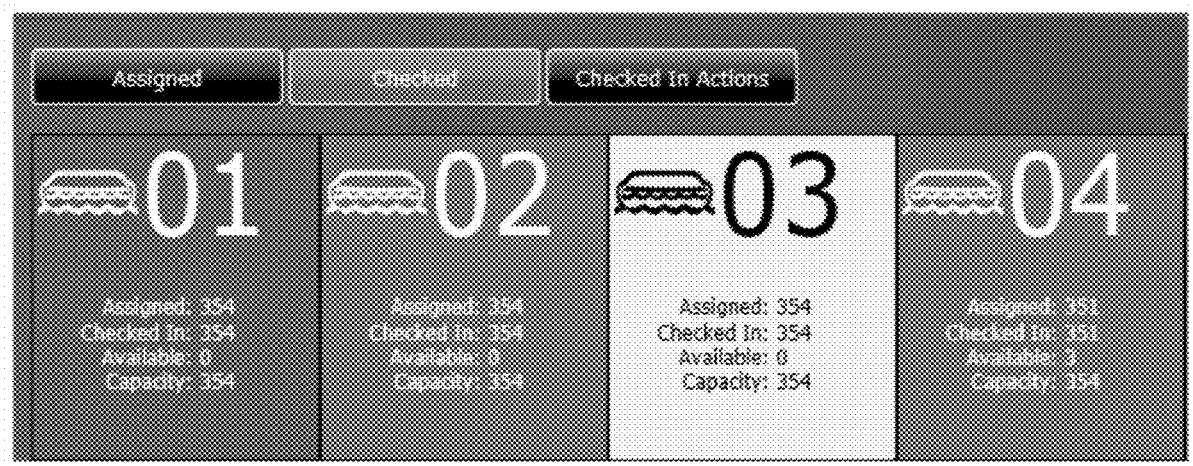
FIG. 20 is a graphical user interface for tracking and accounting of individuals to determine their absence or presence on board vessels to assign them to life boats according to an embodiment of the present invention.
Figure 20:
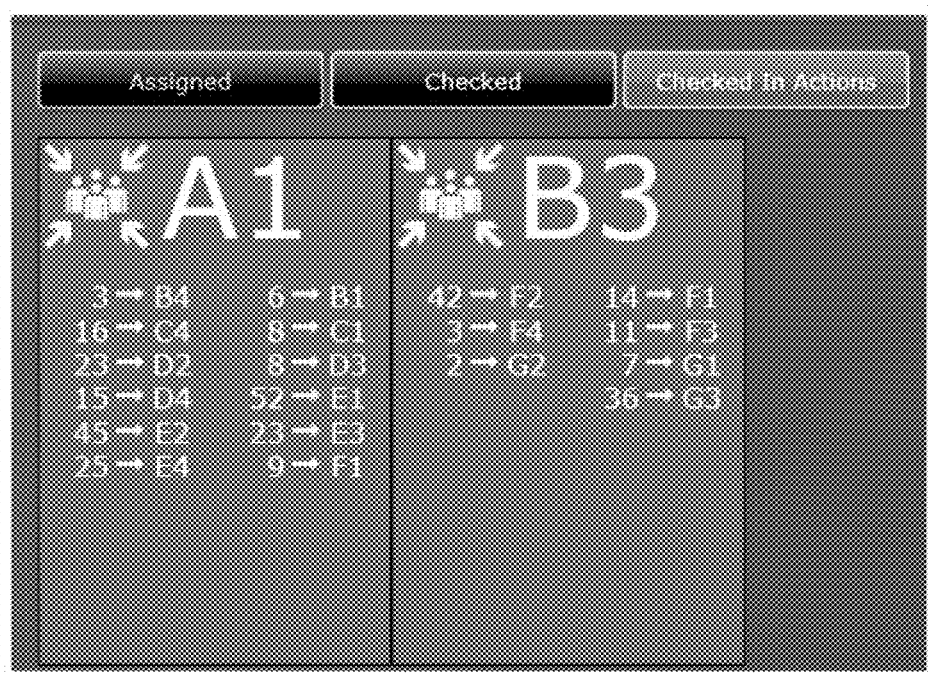

In FIG. 20, panels A, lifeboat 01 is Out of Service. The actions displayed in FIG. 20, panels B are for the muster locations that feed that lifeboat (A1 and B3). When lifeboat 02 is out of service as well, suggested movements will change; however, the number of passengers that need to move remain the same.

Figure 21:
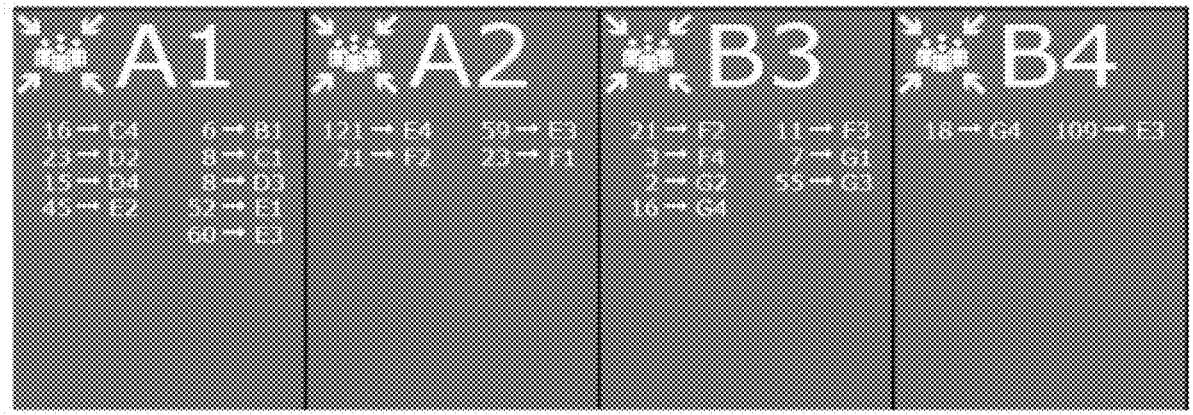
FIG. 21 is a graphical user interface for tracking and accounting of individuals to determine their absence or presence on board vessels to assign them to life boats according to an embodiment of the present invention.

As shown in FIG. 21, when comparing the movements before and after lifeboat 02 went out of service, two changes occurred. 1. Lifeboat 02 receives passengers from Locations A2 and B4. Muster A1 was sending three passengers to B4; however, the system recognized that B4 is out of service and can no longer accommodate any passengers. This altered the suggested movements. Adding up all of the suggested movements for muster A1 will produce the same amount previous suggested (233). 2. All affected muster locations redistribute passengers in alphabetical order. When more than one muster location is affected, the process will sort each muster location and distribute the passengers from the first location it finds. Now that muster location A2 is affected, the movements will occur from this location before looking at previously affected locations. Once location A2 redistributes passengers, the next muster location found will be B3. Although location B3 suggested moving its passengers to E3 and E4, those locations no longer have availability because location A2 used the available space. Location B3 will now attempt to find available space in other lifeboat 127.

Figure 22:
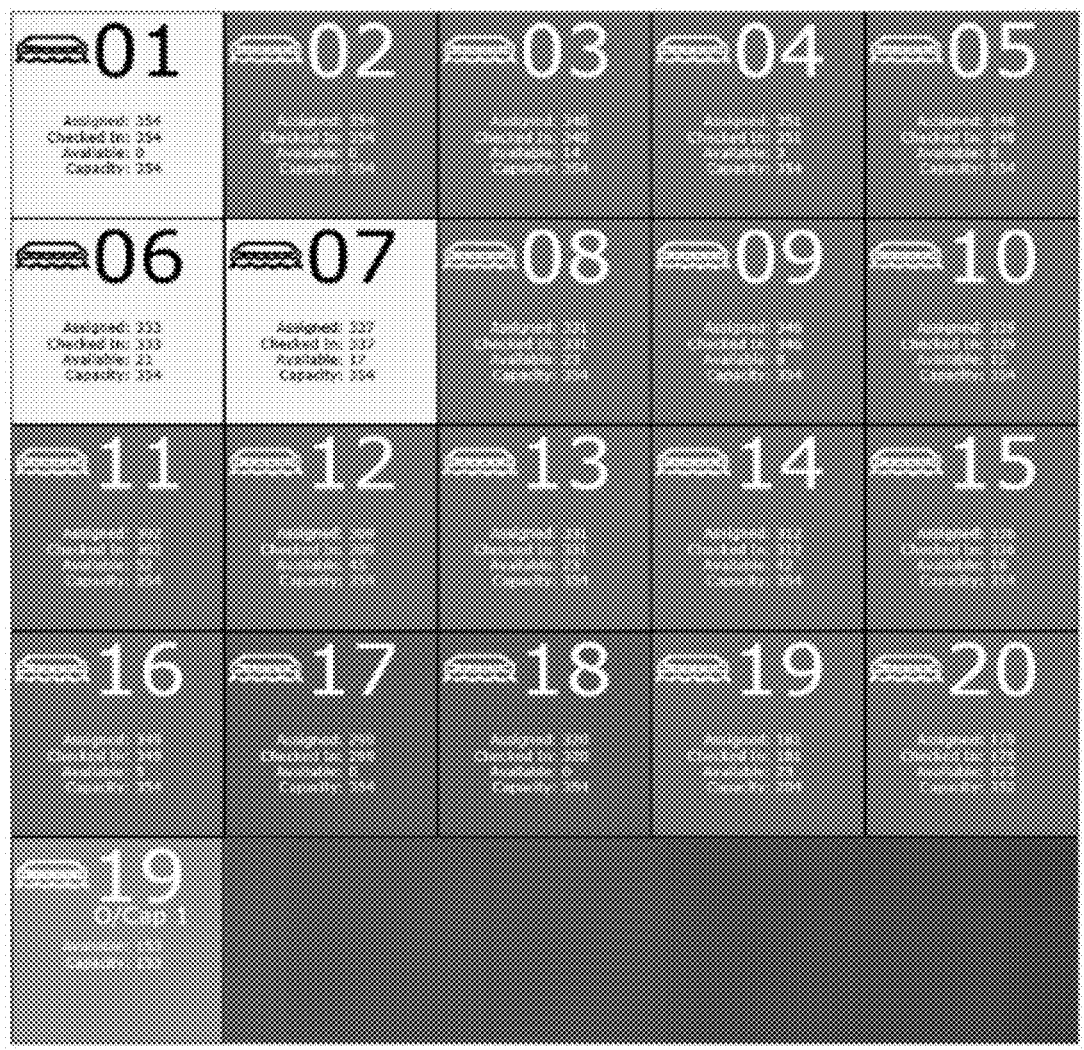
FIG. 22 is a graphical user interface for tracking and accounting of individuals to determine their absence or presence on board vessels to assign them to life boats according to an embodiment of the present invention.
Figure 22:

As shown in FIG. 22, panels A, when a lifeboat goes out of service, the system will suggest moving passengers to muster locations that will fill other lifeboat 127 with remaining capacity (FIG. 7, 710, 712, 714). Each ship is equipped with additional life rafts that deploy if/when needed. Depending on the ship's capacity and the number of passengers sailing, losing a single lifeboat can cause the need for the additional life rafts. Once the system recognizes that there is no more room in any lifeboat, the additional life rafts will start to deploy with suggestions to move passengers to the muster locations that fill them. In FIG. 22, panels A, Life Raft 19 deployed because no capacity remained in any other lifeboat.

Figure 23:
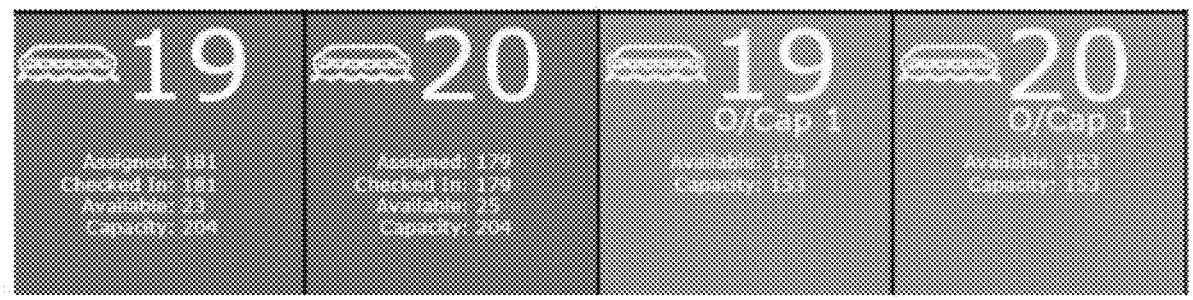
FIG. 23 is a graphical user interface for tracking and accounting of individuals to determine their absence or presence on board vessels to assign them to life boats according to an embodiment of the present invention.
Figure 23:
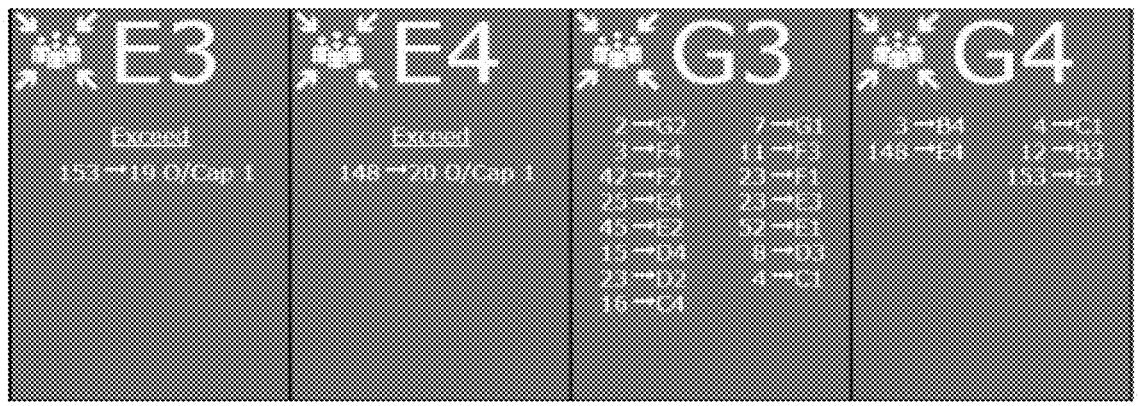
Figure 24:
FIG. 24 is a graphical user interface for tracking and accounting of individuals to determine their absence or presence on board vessels to assign them to life boats according to an embodiment of the present invention.
Figure 24:
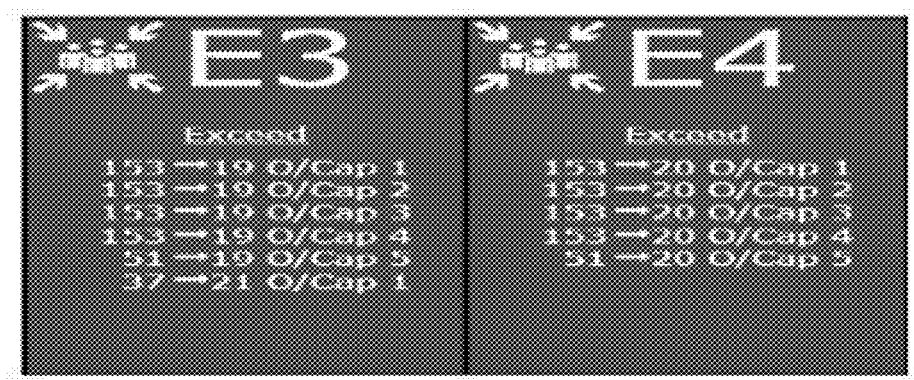

In FIG. 22, panels B, E3, a muster location used to fill additional life rafts, is used to fill the additional life raft, and displays the exceeded value in the Actions tab. For example, E3 Exceed, informs the user that 145 passengers fit in the life raft. Muster G4 filled lifeboat 18. Once every lifeboat's capacity is full, the system suggests moving the remaining 145 passengers As shown in FIG. 23 and FIG. 24, if another Lifeboat is out of service, additional life rafts will deploy. In this example, life rafts are deployed from 19-22. Each location has multiple life rafts. The system will fill 19 and 20 first and will only use 21 and 22, if absolutely needed. As the need for additional life rafts occurs, the system will suggest the first life raft at location 19. If the life raft reaches capacity at 19, the system will recommend deploying the first life raft at 20. If the life raft reaches capacity at 20, the system will recommend deploying the second life raft at 19. This process will continue until all additional life rafts at 19 and 20 are full. Once again, as shown in FIG. 23, panels B, the muster location used to fill the additional life raft will display the exceeded value in the Actions tab. Once all of the life rafts at 19 and 20 are full, locations 21 and 22 will start deploying their additional life rafts and the action will display the suggestions. In FIG. 24, panels A and FIG. 24, panels B, the Overcapacity life raft 21 is not deployed, until all additional life rafts from 19 and 20 have been filled.

Each ship has a predefined number of additional life rafts, which typically equates to 25% of a ship's overall capacity. If a situation occurs where too many lifeboat 127 are inoperable, all of the additional life rafts will deploy. This can also create a situation where there is not enough room for every passenger to board a life vessel. When this occurs, the system will display a warning at the top of the dashboard. The warning informs the users that all survival crafts are full and there is not enough room.

Figure 25:
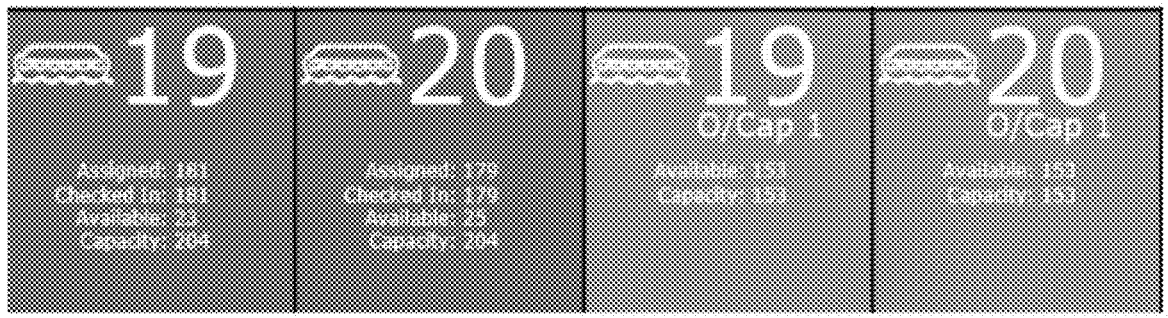
FIG. 25 is a graphical user interface for tracking and accounting of individuals to determine their absence or presence on board vessels to assign them to life boats according to an embodiment of the present invention.
Figure 25:
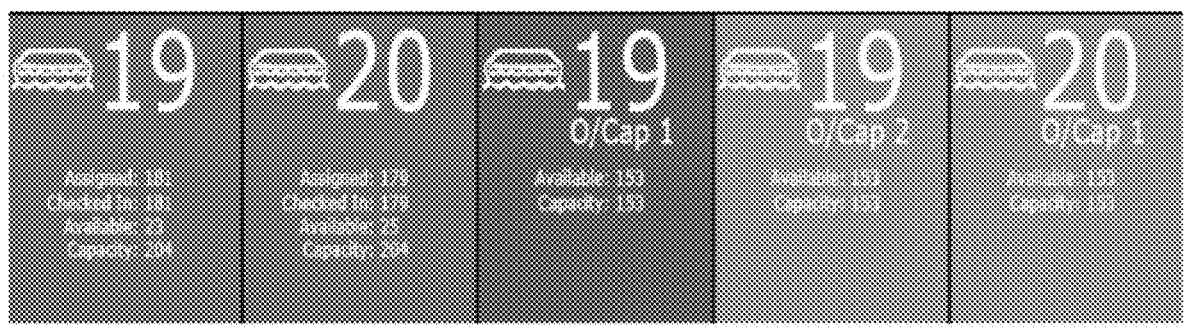

When an additional life raft deploys, a crewmember may determine at that time that the life raft is inoperable. The system will allow the user to take the life raft out of service. When that occurs, the next available life raft will deploy. In the example shown in FIG. 25, panels A, 19 O/Cap 1 and 20 O/Cap 1 deployed. If one of the additional life rafts is inoperable, place it out of service and the next life raft will deploy. In FIG. 25, panels B, the life raft 19 O/Cap 1 is now out of service. Life raft 19 O/Cap 2 immediately deploys when 19 O/Cap 1 is out of service.

Figure 26:
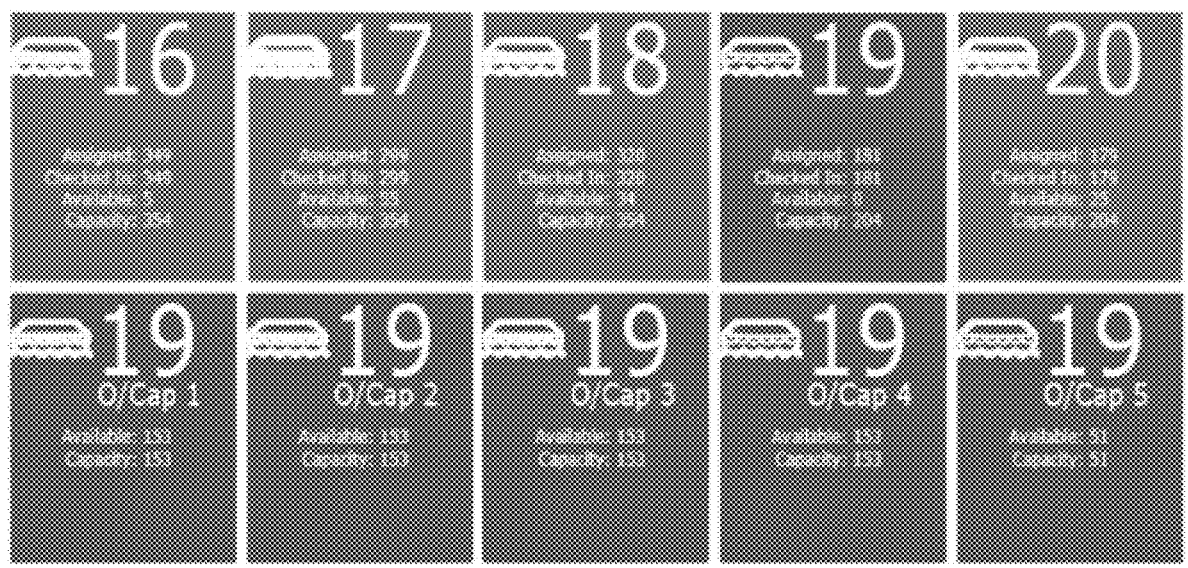
FIG. 26 is a graphical user interface for tracking and accounting of individuals to determine their absence or presence on board vessels to assign them to life boats according to an embodiment of the present invention.

A situation, such as a fire, may occur that deems the entire Deploying of additional life rafts if service is inaccessible. If this were to occur, the user can take out the Marine Evacuation System (MES) and all additional life rafts. All additional life rafts are placed out of service when the MES is inoperable. In FIG. 26, life rafts 19 are shown to become inoperable and displayed on the checked and assigned view in red (color not shown).

Figure 27:
FIG. 27 is a graphical user interface for tracking and accounting of individuals to determine their absence or presence on board vessels to assign them to life boats according to an embodiment of the present invention.

Referring to FIG. 27 the Lifeboat out of Service dashboard includes an option that associates a lifeboat with a muster location or multiple muster locations. The survival craft option provides the ability to set the evacuation route capacity for each lifeboat or life raft. As shown in FIG. 27, panel B, lifeboat 01 is the parent and represents the total capacity for passengers. Survival Craft 01.1 represents the first evacuation route. The muster location associated to this route can feed 225 passengers to the lifeboat. Regarding Survival Craft 01.2, the muster location associated to this route can feed 129 passengers to the lifeboat. Adding both of these values gives you the total of the parent (354).

Figure 28:
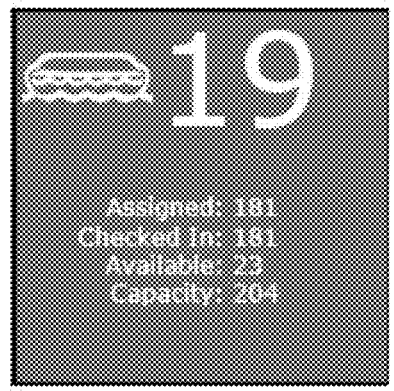
FIG. 28 is a graphical user interface for tracking and accounting of individuals to determine their absence or presence on board vessels to assign them to life boats according to an embodiment of the present invention.

Referring to FIG. 28, each ship can accommodate a predefined number of passengers at the MES. The number of available passenger seats at the Marine Evacuation System is dependent on the amount of crewmembers on board the ship, for each voyage. For the example shown in FIG. 28, panel A, and panel B, assume the Muster location E3 feeds Marine Evacuation System 19 and muster location E3 has been associated to survival craft 19.1 in the database. The capacity in the lifeboat out of service dashboard matches the 204 set at 19.1. As shown in FIG. 28, panel B, there are 181 passengers checked in to muster E3. If needed, the Marine Evacuation System can receive 23 more passengers prior to deploying additional life Marine Evacuation System 19 has a total capacity equal to 560. The capacity set at Passenger Survival Craft 19.1 defines the maximum number of passengers sent to muster E3 before any additional life rafts deploy, if needed. As illustrated, Marine Evacuation System 19 can accommodate 204 passengers.

Figure 29:
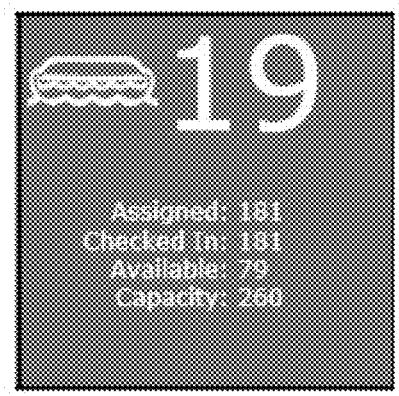
FIG. 29 is a graphical user interface for tracking and accounting of individuals to determine their absence or presence on board vessels to assign them to life boats according to an embodiment of the present invention.

As shown in FIG. 29, the total capacity for Marine Evacuation System 19 is 560, which leaves 356 seats for crewmembers. Marine Evacuation System 19 can accommodate 260 passengers. If the number of crewmembers on board the ship was to decrease for any voyage, a user can navigate to the Passenger Survival Craft option and modify the capacity for 19.1 to accommodate for the fluctuation. When the number of crewmembers decreases, the capacity set at 19.1 increases to allow for more passenger seats. As shown in FIG. 29, panel B, the capacity in the lifeboat out of service dashboard matches the 260 set at 19.1. There are 181 passengers checked in to muster E3. If needed, the Marine Evacuation System can now receive 79 more passengers prior to deploying additional life boats.

While the present invention has been described with reference to the illustrative embodiments, this description is not intended to be construed in a limiting sense. Various modifications of the illustrative embodiments, as well as other embodiments of the invention, will be apparent to those of ordinary skill in the art in reference to this description. It is therefore contemplated that the appended claims will cover any such modifications or embodiments as fall within the true scope of the invention.

We claim:

1. A system for distributing passengers to one or more lifeboats during an emergency at sea comprising: A. one or more CPUs, one or more databases, a plurality of mobile PDA, for communicating with the system, which includes an initiating system for signaling an emergency, a controller for receiving notification of an emergency and sending a lifeboat lockout condition to a receiver, to decrement a count in a register accounting for available space in a lifeboat dependent on the lifeboat lockout condition; B. at least one of the CPUs having a program for (a) accounting for passengers, who require access to the available space on the lifeboat, (b) mustering, and (c) re-routing the passengers to muster stations, based on available space; C. and, assigning passengers to a lifeboat, dependent on an algorithm initiated by receipt of the decrement in a count in the register accounting for available space in the lifeboat dependent on the lifeboat lockout condition, in order to assign passengers to available space on a lifeboat, so that in the case of an emergency, when one or more lifeboats are in a lockout condition, whereby passengers will be safely and expediently assigned to fillable space on a lifeboat.

2. The system in claim 1, further comprising: a lifeboat capacity and operational status signal of lifeboat unavailability, derived from one or more of the following: (1) a poll of a lifeboat lockout sensing device related to its electromechanical lifeboat deployment system; (2) a sensed interrupt signal, initiated by the electromechanical deployment system, (3) an data entry in a data base associate with the availability of a lifeboat, utilizing lifeboat maintenance records, any of the foregoing which initiate a process for organizing passengers into an available lifeboat.

3. The system in claim 1, further including that an emergency at sea initiates to the a controller for sending a lifeboat lockout condition, the initiation resulting from one or more of 1. sensors that actuate alarms, 2. fire alarms, 3. recorded messages, 4. personal text messages, 5. broadcasts over a public address system.

4. The system in claim 1, further including a graphical user interface for tracking and accounting of individuals to determine their absence or presence on board vessels to assign them to life boats.

5. A computerized method for providing passenger access to a lifeboat, comprising: (A) identifying and accounting for individuals needing access to a lifeboat utilizing one or more CPUs, one or more databases, a plurality mobile PDA; (B) receiving a lifeboat lockout condition; (C) decrementing the available space in a lifeboat dependent on the lifeboat lockout condition, (D) mustering and re-routing one or more passengers to muster stations based on available space, and (E) assigning them to a lifeboat, dependent on: (a) obtaining a count of all passengers based on their current muster location; (b) ordering muster and lifeboat pairing of a pre-determined sequence; (c) merging data from steps a and b, based on muster location, into a single, sequenced list; (c) then for each muster location, in a sequence order, filling each paired lifeboat, until the muster location is one of an empty lifeboat or the lifeboat is full; (d) decrementing the total count of passengers from each muster location, based on the filled capacity of each available lifeboat; (e) testing for any muster locations with passenger overages greater than zero; (f) searching for remaining space in any shared lifeboat; (g) adding information to route such that passengers can remain in their current muster location, while continuing to fill available lifeboats or any muster locations that remain in an overages condition; (h) searching neighboring muster locations for remaining lifeboat capacity: (1) assigning a search radius of one, and searching pairs with a sequence variance on either side of a current pair's sequence; (2) increasing the search radius by one, and, (3) repeating steps (h) (1) and (h) (2), until no pairs exist; (j) when lifeboat capacity is found, (1) adding information to the route, to order passengers to muster locations, serviced by an available lifeboat; (k) repeating step (e) for any survival crafts marked as standby; (m) if any muster locations exist with overages, then (n) notifying of a critical situation.

6. The method in claim 5, further comprising: a polling process to determine a lockout condition, including communicating with, and receiving an acknowledgment from, a controller at each of the lifeboats, each of the controllers having a corresponding digital address unique to the corresponding lifeboat; the polling process responsive to receipt of the acknowledgment, transmitting a start code, in order to cause the computation of an algorithm to determine passenger logistics of assembling and passengers being distributed to available lifeboats.

7. The method of claim 5 further includes, initiating the signaling of an emergency for receiving notification of an emergency.

8. A non-transitory computer readable storage medium storing computer executable instructions, which when executed by a computer at a central location causes the computer to carry out a method for providing passenger access to a lifeboat, comprising: (A) identifying and accounting for individuals needing access to a lifeboat utilizing one or more CPUs, one or more databases, a plurality mobile PDA; (B) receiving a lifeboat lockout condition; (C) decrementing the available space in a lifeboat dependent on the lifeboat lockout condition, (D) mustering and re-routing one or more passengers to muster stations based on available space, and (E) assigning them to a lifeboat, dependent on: (a) obtaining a count of all passengers based on their current muster location; (b) ordering muster and lifeboat pairing of a pre-determined sequence; (c) merging data from steps a and b, based on muster location, into a single, sequenced list; (c) then for each muster location, in a sequence order, filling each paired lifeboat, until the muster location is one of an empty lifeboat or the lifeboat is full; (d) decrementing the total count of passengers from each muster location, based on the filled capacity of each available lifeboat; (e) testing for any muster locations with passenger overages greater than zero; (f) searching for remaining space in any shared lifeboat; (g) adding information to route such that passengers can remain in their current muster location, while continuing to fill available lifeboats or any muster locations that remain in an overages condition; (h) searching neighboring muster locations for remaining lifeboat capacity: (1) assigning a search radius of one, and searching pairs with a sequence variance on either side of a current pair's sequence; (2) increasing the search radius by one, and, (3) repeating steps (h) (1) and (h) (2), until no pairs exist; (j) when lifeboat capacity is found, adding information to the route, to order passengers to muster locations, serviced by an available lifeboat; (k) repeating step (e) for any survival crafts marked as standby; (m) if any muster locations exist with overages, then (n) notifying of a critical situation.

9. The claim 8 non-transitory computer readable storage medium wherein receiving a lifeboat lockout condition includes: initiating a signaling of an emergency for receiving notification of an emergency and sending a lifeboat lockout condition to a receiver, decrementing a count in a register, accounting for available space in a lifeboat dependent on the lifeboat lockout condition.

10. The claim 8 non-transitory computer readable storage medium wherein adding information to route such that passengers can remain in their current muster location, while continuing to fill available lifeboats or any muster locations that remain in an overages condition; searching neighboring muster locations for remaining lifeboat capacity is achieved via a graphical user interface for tracking and accounting of individuals to determine their absence or presence on board vessels to assign them to life boats.

* * * * *